US010078752B2

(12) United States Patent
Berg et al.

(10) Patent No.: US 10,078,752 B2
(45) Date of Patent: Sep. 18, 2018

(54) CONTINUOUS MALICIOUS SOFTWARE IDENTIFICATION THROUGH RESPONSIVE MACHINE LEARNING

(71) Applicant: Barkly Protects, Inc., Boston, MA (US)

(72) Inventors: Ryan J. Berg, Austin, TX (US); John J. Danahy, Bow, NH (US); Kirk R. Swidowski, Manteca, CA (US); Stephen C. Carlucci, Lunenberg, MA (US); Christopher Baron, Hingham, MA (US)

(73) Assignee: BARKLY PROTECTS, INC., Boston, MA (US)

( * ) Notice: Subject to any disclaimer, the term of this patent is extended or adjusted under 35 U.S.C. 154(b) by 0 days.

(21) Appl. No.: 15/853,795

(22) Filed: Dec. 23, 2017

(65) Prior Publication Data

US 2018/0189484 A1     Jul. 5, 2018

Related U.S. Application Data

(63) Continuation-in-part of application No. 14/670,721, filed on Mar. 27, 2015, now Pat. No. 9,977,895.

(Continued)

(51) Int. Cl.
*G06F 21/53*     (2013.01)
*G06F 21/56*     (2013.01)
(Continued)

(52) U.S. Cl.
CPC ............ *G06F 21/554* (2013.01); *G06F 21/56* (2013.01); *G06N 99/005* (2013.01); *G06F 2221/033* (2013.01)

(58) Field of Classification Search
CPC ...... G06F 21/53; G06F 21/554; G06F 21/563; G06F 21/566; G06F 9/45558; H04L 63/1416
See application file for complete search history.

(56) References Cited

U.S. PATENT DOCUMENTS 8,214,900 B1    7/2012  Satish et al.
9,292,688 B2 *  3/2016  Avasarala ............... G06F 21/56
(Continued)

FOREIGN PATENT DOCUMENTS

EP          15 76 8346          9/2017

*Primary Examiner* — Saleh Najjar
*Assistant Examiner* — Louis C Teng
(74) *Attorney, Agent, or Firm* — Davis, Malm & D'Agostine, P.C.

(57) ABSTRACT

A security system and method secures and responds to security threats in a computer having a CPU, a Kernel/OS, and software applications. A low-level data collector intercepts a selection of first tier calls between the CPU and Kernel/OS, and stores associated first tier call IDs. A Kernel module intercepts a selection of second tier calls between applications and the Kernel/OS, and stores associated second tier call IDs. An Analytic Engine maps the stored first and second tier call IDs to a rulebase containing patterns of security threats, to generate a threat analysis, and then responds to the threat analysis. The Analytic Engine enlarges or contracts the selection of first and second tier calls to increase or decrease specificity of the threat analysis. A Management Module generates user interfaces accessible remotely by a user device, to update the rulebase and configure the low-level collector, the Kernel module, and the Analytic Engine.

30 Claims, 21 Drawing Sheets

Related U.S. Application Data

(60) Provisional application No. 62/511,428, filed on May 26, 2017, provisional application No. 61/971,244, filed on Mar. 27, 2014.

(51) Int. Cl.
  *G06F 21/55* (2013.01)
  *G06F 9/455* (2018.01)
  *H04L 29/06* (2006.01)
  *G06N 99/00* (2010.01)

(56) References Cited

U.S. PATENT DOCUMENTS

| | | |
|---|---|---|
| 9,665,713 B2 * | 5/2017 | Avasarala ............... G06F 21/56 |
| 2010/0192222 A1 | 7/2010 | Stokes et al. |
| 2011/0185423 A1 | 7/2011 | Sallam |
| 2011/0289586 A1 | 11/2011 | Kc et al. |
| 2013/0198842 A1 | 8/2013 | Klein et al. |
| 2013/0312099 A1 | 11/2013 | Edwards |
| 2014/0075555 A1 | 3/2014 | Shilimkar |
| 2014/0090061 A1 * | 3/2014 | Avasarala ............... G06F 21/56 726/24 |
| 2014/0245444 A1 | 8/2014 | Lutas |
| 2015/0101049 A1 | 4/2015 | Lukacs |
| 2015/0121135 A1 | 4/2015 | Pape |
| 2016/0203318 A1 * | 7/2016 | Avasarala ............... G06F 21/56 726/23 |
| 2017/0262633 A1 * | 9/2017 | Miserendino ......... G06F 21/566 |

\* cited by examiner

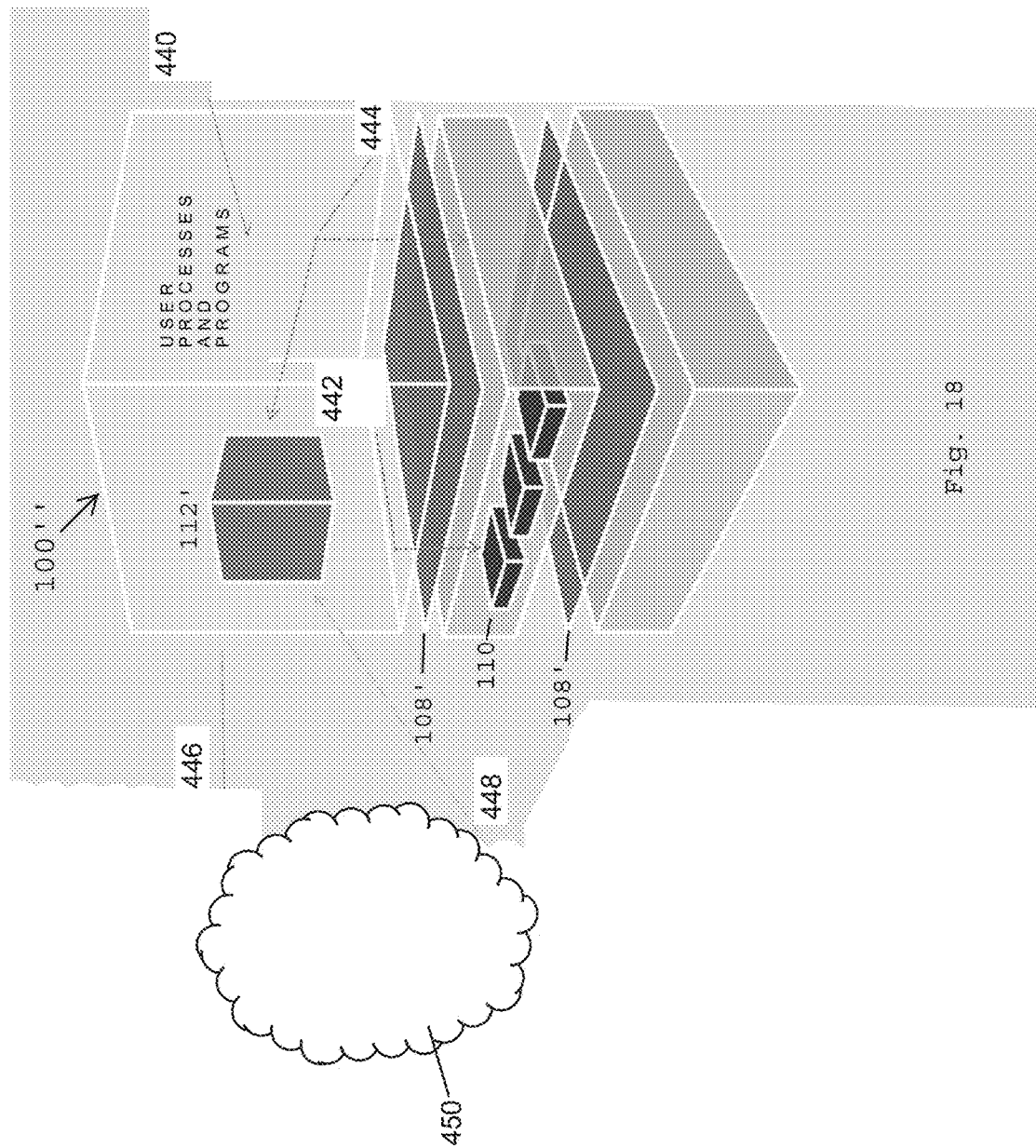

CONTINUOUS MALICIOUS SOFTWARE IDENTIFICATION THROUGH RESPONSIVE MACHINE LEARNING

RELATED APPLICATION

This application claims the benefit of U.S. Provisional Patent Application Ser. No. 62/511,428, entitled Malicious Software Identification Integrating Behavioral Analytics and Hardware Events, filed on May 26, 2017, and is a Continuation-In-Part of U.S. patent application Ser. No. 14/670,721, entitled Malicious Software Identification Integrating Behavioral Analytics and Hardware Events, filed on Mar. 27, 2015, which claims the benefit of U.S. Provisional Patent Application Ser. No. 61/971,244, entitled COMPUTER SECURITY SYSTEM AND METHOD, filed on Mar. 27, 2014, the contents all of which are incorporated herein by reference in their entireties for all purposes.

BACKGROUND

Technical Field

This invention relates to computer system security, and more particularly, to a system and method for autonomously identifying and disrupting multiple forms of malicious software attacks through the correlation of hardware, operating system, and user space events.

Background Information

A mix of high false positives, complex management, unacceptable performance load, and a lack of automatic responses have critically reduced the efficacy and adoption of current security technologies in use at the endpoint. These technologies include anti-virus and malicious code detection products, network and host-based monitoring agents, and traditional host-based IPS and IDS technologies. These technologies are focused on detecting malware and automated attack mechanisms by recognizing direct representations (signatures) of known attack payloads, or by identifying a limited base of inappropriate or unauthorized actions. These approaches have proven increasingly ineffective as attackers use techniques such as polymorphism to change the appearance of attacks and increase their use of zero-day attacks, for which no signatures exist.

Modern attackers also leverage vulnerabilities in common applications and interfaces to elevate their privilege, providing them with the ability to co-opt the system configuration authority of the root user or administrator. From this position, the attackers and their tools can disable, remove, or reconfigure other software that is installed on the system. Existing technologies rely on their ability to instantiate themselves with priority over malware, and that priority is vulnerable in the case of privilege escalation attacks.

The preceding weaknesses in current technologies have led to the development of security systems that operate as nearly fully virtualized versions of the systems they seek to protect. By abstracting the actual operation of system-level functions from processes and users, these security systems can better identify patterns of behavior, and prevent malicious behavior, within the context of the virtualized image. However, the amount of data acquisition and process intermediation required by a fully virtualized or sandboxed environment often creates unacceptable performance impacts on the users of the systems along with other issues.

As a result of these multiple inadequacies, there are few automated solutions available to organizations looking to protect their endpoint systems. In an absence of trusted data and consistent reporting, endpoint security technologies instead provide monitoring data to human interpreters and remote data aggregation suites, from which attack identification and response decisions are made. This latency, between the attack, the detection of the attack, and the disruption or mitigation of the attack often takes months. Skilled individuals capable of recognizing attack patterns, and infrastructures capable of supporting them, also come at a high cost, making them inappropriate for all but the largest of organizations.

SUMMARY

One aspect of the invention includes a security system for securing and responding to security threats in a computer having a Central Processing Unit (CPU), a Kernel/Operating System, and a plurality of software applications. The system includes one or more low-level data collector modules configured to intercept a predetermined selection of first tier calls between the CPU and Kernel/OS, and to store identifying information pertaining to the intermediated first tier calls, i.e., first tier call IDs, in a data store. One or more Kernel Modules are configured to intermediate a predetermined selection of second tier calls between applications/users as they are interpreted by the Kernel/OS and to store identifying information pertaining to the intermediated second tier calls, i.e., second tier call IDs, in the data store. An Analytic Engine aggregates and maps the stored first and second tier call IDs to a rulebase containing patterns of first and second tier call IDs associated with identifiable security threats, to generate a threat analysis. The Analytic Engine selectively enlarges or contracts the predetermined selection of first and second tier calls to respectively increase or decrease specificity of the threat analysis. The Analytic Engine is also configured to take responsive actions in response to the threat analysis. A Management Module is configured to generate user interfaces accessible remotely, e.g., via the Internet, by a user device, to enable a user to update the rulebase and configure the low-level collector module, the Kernel module, and the Analytic Engine.

In another aspect of the invention, a method is provided for securing and responding to security threats in a computer having a Central Processing Unit (CPU), a Kernel/Operating System, and a plurality of software applications. The method includes intermediating a predetermined selection of first tier calls between the CPU and the Kernel/Operating System, and storing first tier call IDs in a data store. Second tier calls between the Kernel/OS and the applications are intermediated, with second tier call IDs stored in the data store. An Analytic Engine aggregates and maps the stored first and second tier call IDs to a rulebase to generate a threat analysis. The Analytic Engine selectively enlarges or contracts the predetermined selection of first and second tier calls to respectively increase or decrease specificity of said threat analysis. The Analytic Engine also implements responsive actions in response to the threat analysis. A Management Module generates a plurality of user interfaces to enable a user, via a user device, to update the rulebase and configure low-level collector and Kernel modules, and the Analytic Engine.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 18 is a functional block diagram illustrating aspects of the embodiment of FIG. 17;

DETAILED DESCRIPTION OF APPROACH

Figure 1A:
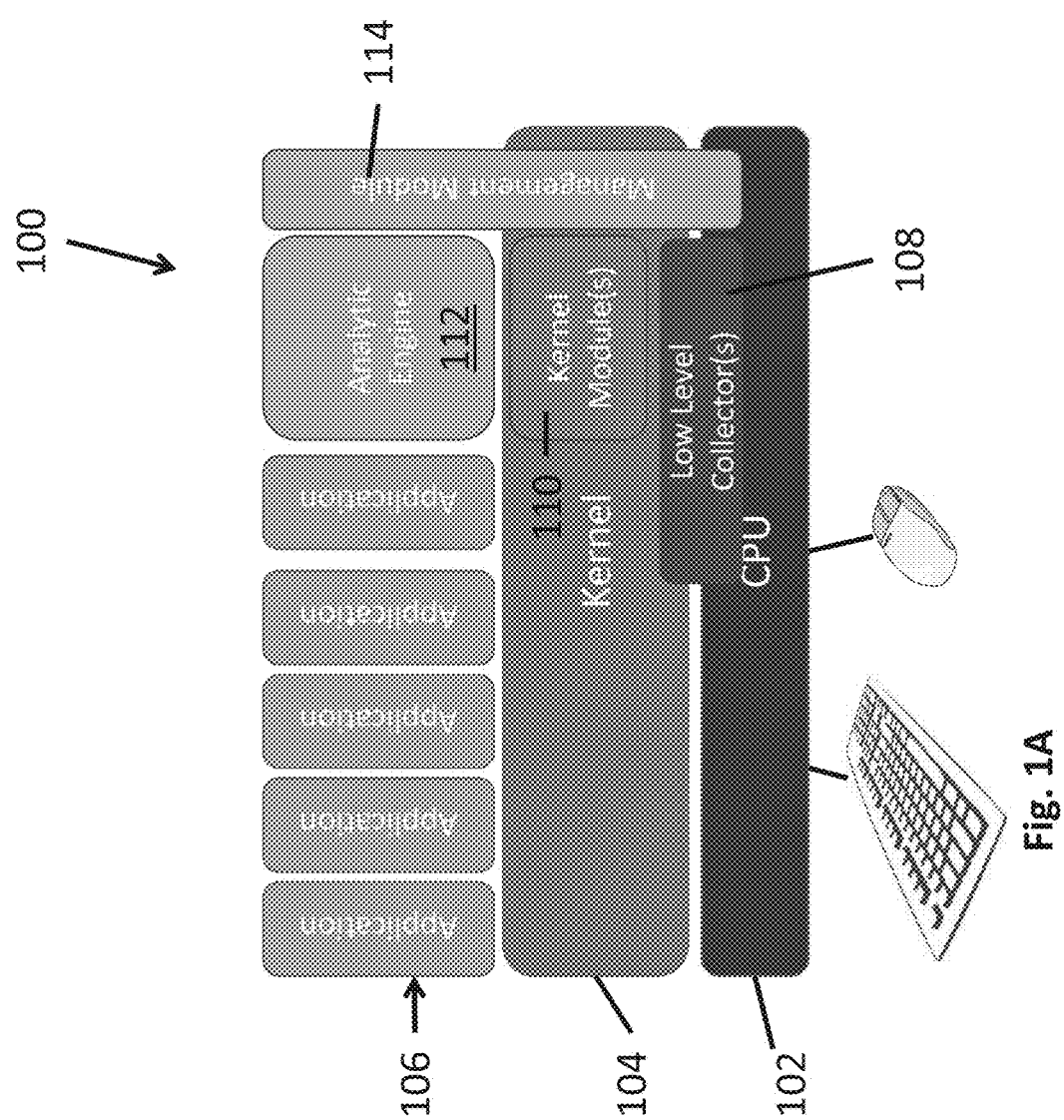
FIG. 1A is a block diagram of one embodiment of a system in accordance with the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, the terms "computer" and "user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Terms such as "component," "module", and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Overview

Briefly summarized, embodiments of the invention identify undesired process behaviors through high-performance analysis of a unique dataset containing outputs from custom collectors at each level of the computer system. For example, logfile, configuration, and process activity data may be gathered from user space, device driver and operating system information may be gathered from the kernel, and machine-level instruction and interrupt information is captured or derived from native hardware events. This information is organized into a structure that has been optimized for querying against a local rulebase that contains identifying patterns of common behaviors in malicious software. The result of this analysis is the capability to detect and disrupt the installation or operation of many types of malicious software.

These embodiments integrate a discrete set of collector interfaces, configured to gather a limited number of data elements required to satisfy the identification requirements of malicious behaviors defined in the rulebase. By limiting the information gathered and the calls/interfaces intermediated, minimal load is placed on the system, to likewise minimize the performance impact experienced by the users of the system.

The approach used in these embodiments validates the positive existence of unauthorized or malicious behavior. In an exemplary implementation, this validation is applied to the actions undertaken by active software processes on the system, where the requests, process control, and network connections associated with a software program are monitored to identify specific indicators of potential malicious behavior. These monitored parameters, which may otherwise simply appear anomalous or benign, are then compared to a rulebase of known patterns of malicious behavior, to automatically identify and respond to threats in real time. It should be noted that these embodiments are not merely identifying the signatures of particular viruses or malware, but instead, are broadly characterizing patterns of behavior common to entire classes of assailants, to cast a broader net than conventional approaches, such as described below.

This approach yields a new level of substantial certainty which drives confidence in results and the capability to take automatic remediating or mitigating action, without reliance on a human-driven system. Particular embodiments may also recognize patterns associated with non-programmatic, human-driven attacks, in order to act upon those attacks in real time.

Legacy technologies fall into two main categories, and suffer from three separate shortcomings which are commonly described as the issues of False Negatives, where actual attacks are not identified and disrupted, False Positives, where benign behavior is flagged as potentially harmful and where the volumes of data distracts users from actual protection tasks, and Unacceptable Performance Impacts.

As aspect of the present invention was the inventors' recognition that false negatives are a significant problem for existing technologies such as anti-virus and anti-malware offerings that attempt to provide protection from malicious behavior that is local to the system. These tools rely upon an ability to uniquely identify malicious software by fixed attributes of the compiled software itself, namely, the aforementioned 'signatures'. These signatures are derived from an analysis of the content of the executable image. The present inventors have recognized that signature-based approaches tend to fail because of the new practice among virus creators of rebuilding the virus during the attack process, yielding a unique version of the same functional virus. Such an approach is called polymorphism, and it results in a widespread inability of these tools to identify many common attacks. Similarly, this signature-based approach is ineffective against new, or zero-day, attacks that have not previously been used. In this case, no signature exists, resulting in a lack of protection on the system.

Other conventional tools take the approach of seeking to use the source or network address of a connecting process or email system to identify malicious actors. The present inventors have recognized, however, that the dynamism of current network naming and address assignment makes those approaches similarly incomplete and out-of-date.

The instant inventors have also recognized that False Positives are a major problem for host and network based intrusion detection, intrusion prevention, and security incident and event management (SIEM) solutions. In most cases, these tools rely on the identification of anomalous behaviors among the messages from the systems that they protect. In the presence of activities that fall outside the set of either historical or expected behaviors, users and systems receive alerts that a potentially malicious activity is under way. This often results in an overwhelming challenge in terms of the volume of messages resulting from highly dynamic environments, or in a corresponding analytic challenge to merge and correlate data at a sufficient speed and accuracy to make the analytic results useful. Human intervention is thus typically required because the condition is best described as Not-known-good, as opposed to Known-bad. The alerts which are sent on Not-known-good events are, in the majority, benign, resulting in the challenge of widespread false positives.

A newer approach to anomalous and malicious behavior detection is based on the virtualization technology, where entire sessions of user or system behavior are managed inside a virtual container, which separates the actual operation of the system from the perceived operation of processes by the user.

An aspect of this invention is the inventors' recognition that the performance impact, uncertain reliability, and software platform dependence of virtualization approaches render them inappropriate for many users and security applications.

In a generalized virtualization approach, technology is used to construct a complete virtual image of the system in which either the entire operating system or some user application is instantiated and run. In order to do this, the virtualizing system is required to maintain state data around most, if not all, calls, data use, and even user interface interaction in order to simulate the expected behavior of the system. The virtualization should also intermediate most, if not all, calls that are capable of existing between the user or process in the virtualized environment.

As a result of these requirements, there is substantial overhead associated with the population and management of the virtual environment, and individual actions are separately processed and delayed through the intermediation process. Because of the depth of the intermediation, there also tends to be strict requirements for the platforms that are supported, due to the need to understand and instrument most, if not all of the calls.

In embodiments of the present invention, the problems of False Negatives and False Positives are addressed through the unique combination of a ruleset for known malicious behaviors and a new form of information gathering represented by a combination of multi-level collectors and the correlating capabilities of an Analytic Engine. When behavioral data from the collectors is assembled to match known indicators in the rulebase, protection and notification occur regardless of the actual on-disk representation/signature, source, or construction of the executable. When captured data correlates to the patterns of behavior represented in the rulebase, action may be effectively deemed conclusive and directly related to a known bad event. The protection is applied in real time, and in particular embodiments, local to the machine.

In these embodiments, the negative effects of full virtualization are mitigated by the use of the flexible low-level collector/framework, in which only a relatively small subset of the possible calls need to be examined and intermediated. Such use of only a small subset of calls is possible because of the tiered approach, which will be described in greater detail hereinbelow, to significantly reduce the performance impact of the inventive solution relative to prior art approaches such as the aforementioned virtualization approach.

In response to this need for immediate real time response and local action, not requiring human intermediation, the present invention includes a method and system for automatically protecting endpoint systems from the effects of attacks and malicious software. A method according to the present invention provides for the identification of malicious and unauthorized behavior in order to trigger appropriate steps for mitigation and disruption. Methods and systems in accordance with the present invention employ new forms of information collection and analysis that are hardware and software agnostic and are capable of informing behavior analytics. These embodiments can further use the result of these analytics to disrupt the attack in real time.

In accordance with embodiments of the invention, data is provided through a selective low level monitoring and data collection technology that operates between the CPU hardware and any existing hypervisor and/or host operating system. This data provides the capability to differentiate between the actual users of a system under attack, the attack that is impersonating an authorized user or process, and the operations that are being undertaken on the system.

In particular embodiments, this technology provides access to system functions while employing real-time analytics that adapt the criteria of the identification activity in order to further distinguish actual attacks from potential false positive reports. The system functions provide both data and operational capabilities, and the resulting information flows inform the assessment of which rules should be applied to the current scenario.

The criteria supplied can be organized as a structured rule syntax, extensible by authorized individuals, which is then parsed by the protection mechanism in order to identify new indicators of attack. This information may also be made available to multiple instances of the invention to provide consistency of behavior across multiple, e.g., networked, systems.

In these embodiments, the structured rule syntax can also be linked to response actions, specific to the identified malicious behavior, in order to provide a flexible means of integrating organizational priorities with the output of the malicious behavioral analysis.

Analytic results can be used to immediately interdict attacks in process. The results can also be used to generate real time alerts to users and groups in order to better inform aggregated analysis and organizational security practices.

In particular embodiments, the protection provided is not visible by either local users or by processes through the use of these low-level capabilities. Implementing a separate interface to technical functions such as memory management and process invocation allows the embodiments to selectively respond to requests for data, and to cloak its operation and existence.

Control of the rules, response, and versioning of the particular embodiment are also managed through the low-level capabilities of the host computer, through the use of user interfaces generated by an integral management module for display on remotely connected user devices. These interfaces may be configured to perform the functions of event aggregation, trending, and presentation. The information presented may relate to the actual attacks or behaviors disrupted, and may not, as a matter of course, include information which is unrelated to conclusively identified attacks.

Hardware Event Gathering and Analytics

An approach for selective real-time hardware interrupt vector content gathering by a security-focused behavioral analytics system is provided. In particular embodiments, a thin, machine-level collector is deployed within the interrupt handling control chain that intermediates service requests associated with operations and interrupts servicing selected hardware and software, to include events triggered by the CPU, operating system and user space, for the purpose of providing unique context in order to positively correlate user identity, privilege, and process activity.

The implementation of this intermediation minimizes latency and performance load by limiting its functions to simply recognizing the event in a low level collector module associated with that device, and passing the current interrupt context to a lightweight buffering mechanism which stores the data within the memory presently allocated to the low level collector(s). Transformation and processing of this information may be done within user space in order to capitalize on traditional system scheduling and performance optimizations.

The data, once gathered, is attributed to one or more classes of malicious behavior, and is used in conjunction with information from other collectors to identify processes or threads that are known to be destructive or unauthorized.

In particular embodiments, the Low level collector(s) employs a selective framework of collectors that is configurable to load only modules necessary to intermediate events and calls that are directly related to malicious and unauthorized behaviors from the rule base. As new malicious behaviors are recognized in research, or as more information is required in the analysis of system attacks, new modules can be transparently loaded and unloaded from this low-level framework, e.g., via a management module.

When an intermediated call is analyzed and found to contain context indicating that it could be a component of an unauthorized or malicious behavior as defined by rulebase contents, additional information that has been gathered from previous events is integrated in the correlation to confirm or exclude the call from the list of potential incidents.

This implementation includes the creation of the configurable low level collector/framework, which is a real-time mechanism for securely controlling and modifying collector behavior, a language and storage mechanism for rules defining consequent actions, and an active component of analysis capable of translating identified risks into action.

Turning now to now to the accompanying figures, particular aspects of the present invention will now be described in detail. As shown in FIG. 1A, a representative computer system onto which an embodiment of the present invention is deployed, is shown as system 100. This system 100 includes a computer having a processor (CPU) 102, a Kernel/Operating System (Kernel/OS) 104, a plurality of Applications 106, and one or more low-level data collector modules 108, such as in the form of a conventional microhypervisor ("microvisor") configured in the accordance with the teachings herein. Those skilled in the art will recognize that the term microvisor refers to a security-focused hypervisor that provides micro-virtualization technology to ensure secure computing environments. Short for micro-hypervisor, a microvisor works with the VT (Virtualization Technology) features built into Intel, AMD and other CPUs to create hardware-isolated micro virtual machines (micro-VMs) for each task performed by a user that utilizes data originating from an unknown source. Embodiments of the present invention use a microvisor based on a Type-1 hypervisor. Those skilled in the art will recognize that Type-1 hypervisors run directly on the host's hardware to control the hardware and to manage guest operating systems. For this reason, they are sometimes called bare metal or native hypervisors. In these embodiments, the otherwise conventional Type-1 microvisor has been modified to intercept (intermediate) a predetermined selection of calls (first tier calls) between the CPU 102 and Kernel/OS, and to store identifying information pertaining to the intermediated first tier calls (first tier call IDs) in a data store. One or more Kernel Modules 110 are configured to intermediate a predetermined selection of calls (second tier calls) between applications/users as they are interpreted by the Kernel/OS and to store identifying information pertaining to the intermediated second tier calls (second tier call IDs) in the data store. An Analytic Engine 112 aggregates and maps the stored first tier call IDs and second tier call IDs to a rulebase, to generate a threat analysis. As mentioned hereinabove, the rulebase includes patterns of first tier call IDs and second tier call IDs associated with identifiable security threats. In particular embodiments, the Analytic Engine is configured to selectively enlarge or contract the predetermined selection (e.g., increase or decrease the number) of first tier calls and second tier calls to respectively increase or decrease specificity of the threat analysis. The Analytic Engine is also configured to take responsive actions in response to the threat analysis. A Management Module 114 is configured to generate a plurality of user interfaces accessible remotely, e.g., via the Internet, by a user computer, to enable a user (e.g., having administrative privileges) to update the rulebase and configure the low-level collector module 108, the Kernel module 110, and the Analytic Engine 112.

The Analytic Engine 112 may take any number of actions in response to a detected threat. Non-limiting examples include one or more of (a) process termination, (b) thread termination, (c) event and alert notification and logging, (d) user disablement, (e) network disconnection, and (f) process fingerprinting.

It should be recognized that the first tier calls include one or more events or calls for activity that would otherwise pass directly between the CPU, hardware devices, and/or the Kernel/Operating System. In should also be recognized that the predetermined selection of first tier calls represents a relatively small subset of the full range of calls capable of being passed between the CPU 102 and Kernel/OS 104. The use of such a subset provides the aforementioned benefits including low processing overhead, increased processing speed, etc. Non-limiting examples of calls includable in the predetermined selection of first tier calls include one or more of (a) apicmod=Advanced Programmable Interrupt Controller Module, (b) gmmumod=Guest Memory Management Unit Module, (c) gpmmumod=Guest Physical Memory Management Unit Module, (d) idtmod=Interrupt Descriptor Table Module, (e) kymtrmod=Keyboard Monitor Module, (f) msmtrmod=Mouse Monitor Module, (g) mxmlmod=Mini XML Module, (h) nwmtrmod=Network Monitor Module, (i) prmtnmod=Preemption Module, and (j) udis86mod=udis86 Module.

The second tier calls include one or more events or calls for service or data between the applications and the Kernel/Operating System including scheduling and functional service delivery. As discussed above with respect to the first tier calls, the predetermined selection of second tier calls also represents a relatively small subset of the full range of calls capable of being passed between the applications and the Kernel/OS. Non-limiting examples of calls includable in the predetermined selection of second tier calls includes communications with one or more of a (a) Network Monitor Driver, (b) Registry Monitor Driver, (c) Filesystem Monitor Driver, (d) Process Monitor Driver, and (e) Process Governor Driver.

As mentioned above, in particular embodiments, both the rulebase and the data store used to store the first and second tier call IDs, are local to system 100, e.g., disposed in memory associated with Analytic Engine 112 and/or Management Module 114. However, in some embodiments, the data store and/or the rulebase may be disposed remotely from the system 100. For example, the data store used to store the first and second tier call IDs may take the form of data store 504 used by Management Platform Server 450 as described hereinbelow with respect to FIGS. 18 and 20.

Figure 1B:
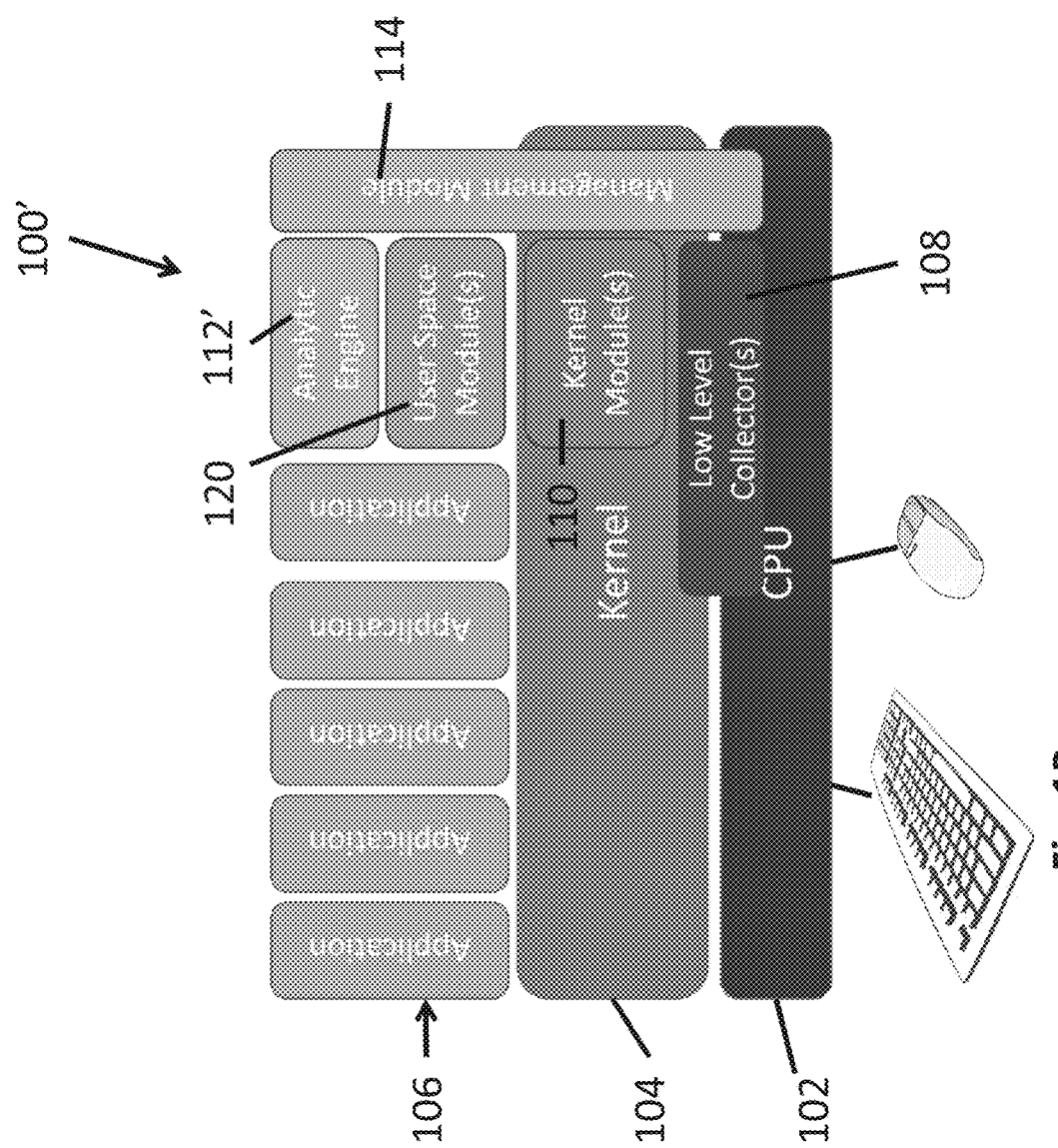
FIG. 1B is a block diagram of an alternate embodiment of a system in accordance with the present invention.

Turning now to FIG. 1B, an alternate embodiment of the present invention is shown as system 100'. This system 100' is substantially similar to system 100 (FIG. 1A), while also including one or more User Space Modules 120.

The user space module(s) 120 is configured to collect a predetermined selection of user space data associated with the applications, and to store identifying information pertaining to the collected user space data (user space IDs) in the data store. As discussed above with respect to the first and second tier calls, the predetermined selection of user space data represents a relatively small subset of the full range of user space data capable of being generated and/or collected. Non-limiting examples of user space data usable in the predetermined selection of user space data include one or more of (a) Application Mouse Activity, (b) Application Keyboard Activity, (c) System Logfile Activity, and (d) System Registry Fields.

The Analytic Engine 112' is substantially similar to Analytic Engine 112, while also being configured to aggregate and map the user space IDs, along with the first and second tier call IDs, to the rulebase to generate a threat analysis. It will be noted that in this embodiment, the rulebase includes patterns of first tier call IDs, second tier call IDs and user space IDs associated with identifiable security threats. Similarly, the Analytic Engine 112' is configured to selectively enlarge or contract the predetermined selection of first tier calls, the predetermined selection of second tier calls, and/or the predetermined selection of user space data to respectively increase or decrease the specificity of said threat analysis.

It should also be noted that any of these predetermined selections may be automatically enlarged to increase the specificity of the threat analysis from a base level to one or more escalated levels when the threat analysis identifies a potential security threat. Conversely, any of the predetermined selections may be automatically contracted to decrease the specificity of the threat analysis, e.g., to free up computing resources, from the one or more escalated levels towards the base level once one or more of the aforementioned responsive actions has been implemented.

Thus, unlike existing approaches which adapt security reporting and response according to statically identified behaviors on the system, these embodiments reconfigure their own data gathering capability to create an increasingly detailed understanding of the potential security events when necessary.

Emulating the process invoked by a human analyst, the implementation integrates the information gathered during previous call examination in order to more narrowly consider the inputs necessary to further investigate potentially damaging attacks.

The information collection happens through information passed to lightweight buffers which surface data to higher-level processing and analytic functions operating according to ordinary system scheduling, thereby minimizing the performance impact and visibility of the embodiment.

Automated Low Level Collector(s) Configuration

It should be recognized that knowledge gained through an observed malicious or unauthorized activity on one system 100, 100' may be shared among all systems in a network utilizing the embodiments shown and described herein. Observable events are identified locally but may be shared globally increasing the learning efficiency of unrelated systems and preventing the spread of the observed malicious activity. For example, the particular first tier, second tier, and user space IDs associated with particular threats identified by one system 100, 100', may be added to the rulebase used by other systems 100, 100' to potentially provide for quicker threat identification by those other systems.

The capability described in the embodiment is defined by real-time knowledge of ongoing system behavior that is identified by characteristics described in the configurable rulebase. The system can also leverage the capability of the embodiments' real-time rulebase modifications to react to information provided by other embodiment systems and presented from foreign systems. The analytic engine may thus receive communication from other data sources that can then be transformed into the appropriate conditions to trigger application of rule changes. In this case, the implementation of the rule will include necessary protection behaviors to prevent the advancement or proliferation of an identifiable attack emanating from another machine on the local network. In this regard, the detection of a particular malware activity on a protected machine may be shared with any locally or remotely accessible systems. In response, those other systems, while uninfected, are aware of the conditions and network location of the offending system, and can therefore apply that inhibit or prevent connection from the offending machine or of the traffic type known to be causing the initial response on the foreign system. Existing implementations of the current state of the art do not contemplate this level of communication and coordination between low-level system protection technologies. The communications between systems protected by the invention delivers real-time status from adjacent systems, reporting on identifiable security events that they are experiencing.

Embodiments of the present invention may provide additional preventative behaviors to ensure that the security event on the initial machine is not allowed to further corrupt other adjacent machines. In this way, embodiments of the present invention can update both the indicators of a potential attack and the appropriate automated responses that can range from increased monitoring to denial of connections from the foreign exploited system. It is noted that conventional virus definition updates are based on the premise of a static signature, while the approach described with respect to the instant embodiments is effectively a "hive mind", in which collective knowledge is shared in real-time so all systems share a collective understanding of potential malicious activity and sources.

Having described embodiments of the system 100, 100' of the present invention, an exemplary method in accordance with aspects of the present invention will now be described as illustrated by the following Table I.

As shown, a method 200 for securing and responding to security threats in a computer having a Central Processing Unit (CPU), a Kernel/Operating System, includes intermediating 202, with low-level data collector module 108, a predetermined selection of first tier calls between the CPU and the Kernel/Operating System, and storing identifying information pertaining to the intermediated first tier calls (first tier call IDs) in a data store. At 204, second tier calls are intermediated with kernel module 110, information pertaining to the intermediated second tier calls (second tier call IDs) is stored in the data store. At 206, Analytic Engine 112 aggregates and maps the stored first tier call IDs and second tier call IDs to a rulebase, to generate a threat analysis. At 208, the Analytic Engine selectively enlarges or contracts the predetermined selection of first tier calls and the predetermined selection of second tier calls to respectively increase or decrease specificity of said threat analysis. At 210, the Analytic Engine implements one or more of a plurality of responsive actions in response to the threat analysis. At 212, the Management Module 114 generates a plurality of user interfaces to enable a user, via a communicably coupled user device, to update the rulebase and configure the low-level collector module 108, the Kernel module 110, and the Analytic Engine 112.

TABLE I

| | |
|---|---|
| 202 | Intermediate and store first tier calls |
| 204 | Intermediate and store second tier calls |
| 206 | aggregate and map stored first tier call IDs and second tier call IDs to a to generate a threat analysis rulebase to generate a threat analysis |
| 208 | selectively enlarge or contract the selection of first tier calls and second tier calls |
| 210 | implement responsive actions in response to the threat analysis |
| 212 | generate user interfaces to enable a user to update rulebase and configure the low-level collector, Kernel module, and Analytic Engine |

Optional aspects of the method of Table I are shown and described with respect to the following Table II. As shown at 214, step 210 may further include implementing one or more of a plurality of responsive actions including process termination, thread termination, event and alert notification and logging, user disablement, network disconnection, and process fingerprinting. At 216, method 200 may further include using user space module 120 to collect a predetermined selection of user space data associated with the applications, and store identifying information pertaining to the collected user space data (user space IDs) in the data store. At 218, step 206 may include aggregating and mapping the stored first tier call IDs, second tier call IDs, and the user space IDs to the rulebase, to generate a threat analysis. At 220, step 208 may include selectively enlarging or contracting the predetermined selection of first tier calls, the predetermined selection of second tier calls, and/or the predetermined selection of user space data to respectively increase or decrease the specificity of said threat analysis.

At 222, step 208 may further include automatically enlarging the predetermined selection of first tier calls, the predetermined selection of second tier calls, and/or the predetermined selection of user space data to increase the specificity of said threat analysis from a base level to one or more escalated levels when the threat analysis identifies a potential security threat. At 224, step 208 may further include automatically contracting the predetermined selection of first tier calls, the predetermined selection of second tier calls, and/or the predetermined selection of user space data to decrease the specificity of said threat analysis from the one or more escalated levels towards the base level once one or more of the plurality of responsive actions has been implemented.

TABLE II

| | |
|---|---|
| 214 | implement responsive actions including process termination, thread termination, event and alert notification and logging, user disablement, network disconnection, and process fingerprinting |
| 216 | collect and store user space data |
| 218 | aggregate and map first tier call IDs, second tier call IDs, and user space IDs to the rulebase to generate threat analysis |
| 220 | selectively enlarge or contract the selection of first tier calls, second tier calls, and/or the selection of user space data to respectively increase or decrease the specificity of the threat analysis. |
| 222 | automatically enlarge the selection from a base level to one or more escalated levels when the threat analysis identifies a potential security threat |
| 224 | automatically contract the selection from the one or more escalated levels towards the base level once responsive action has been implemented. |

EXAMPLES

Turning now to FIGS. 2-16, examples of attacks on a conventional system (Example I, FIGS. 2-8) and on a system 100' of the present invention (Example II, FIGS. 9-16) are shown and described.

Example I

In this example, the described approach is illuminated through an examination of the behavior of the system in the presence of a common attack type.

Specific Attack

Figure 2:
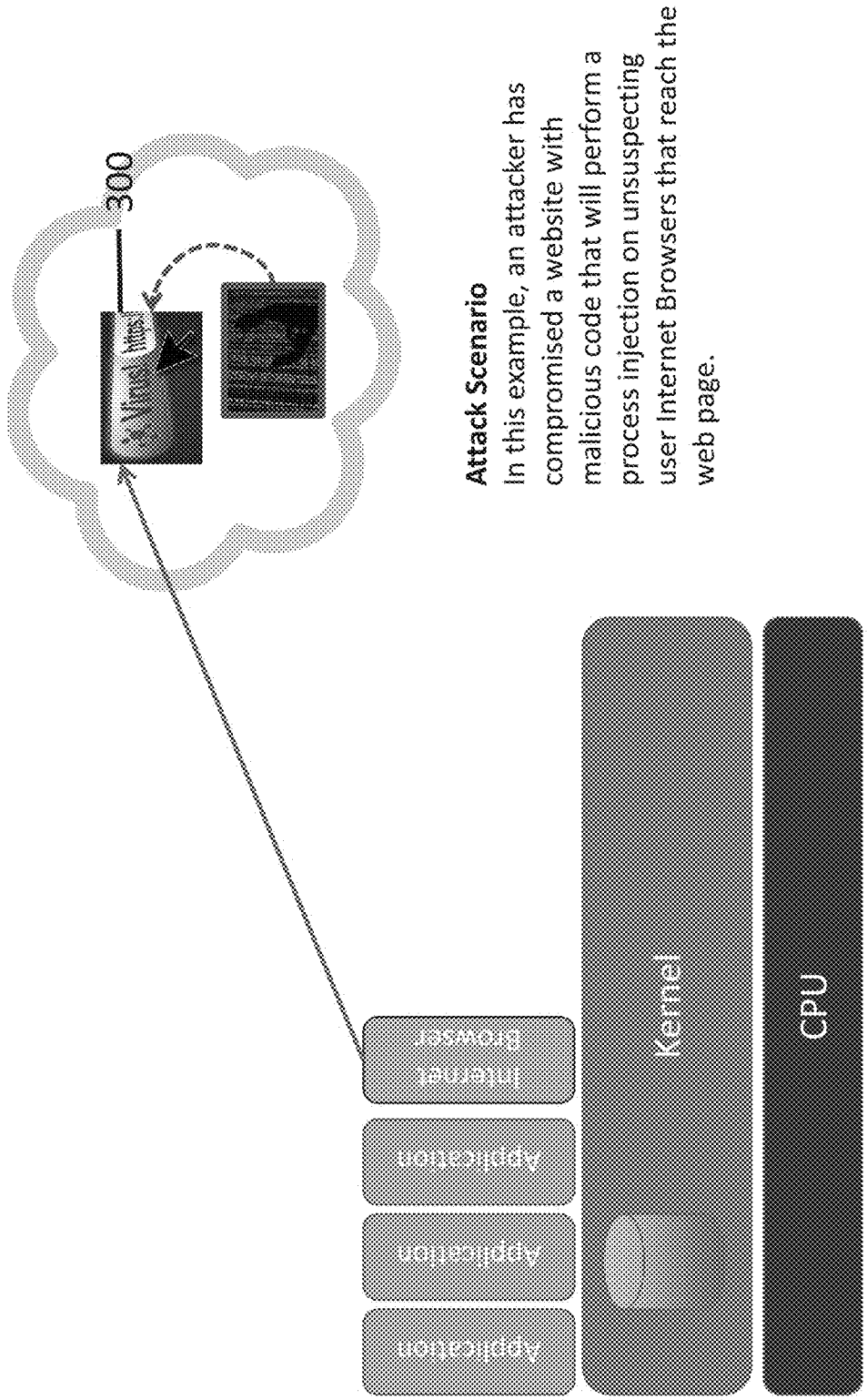
FIG. 2 is a block diagram of a system of the prior art, during a step in an exemplary malicious attack scenario.
Figure 3:
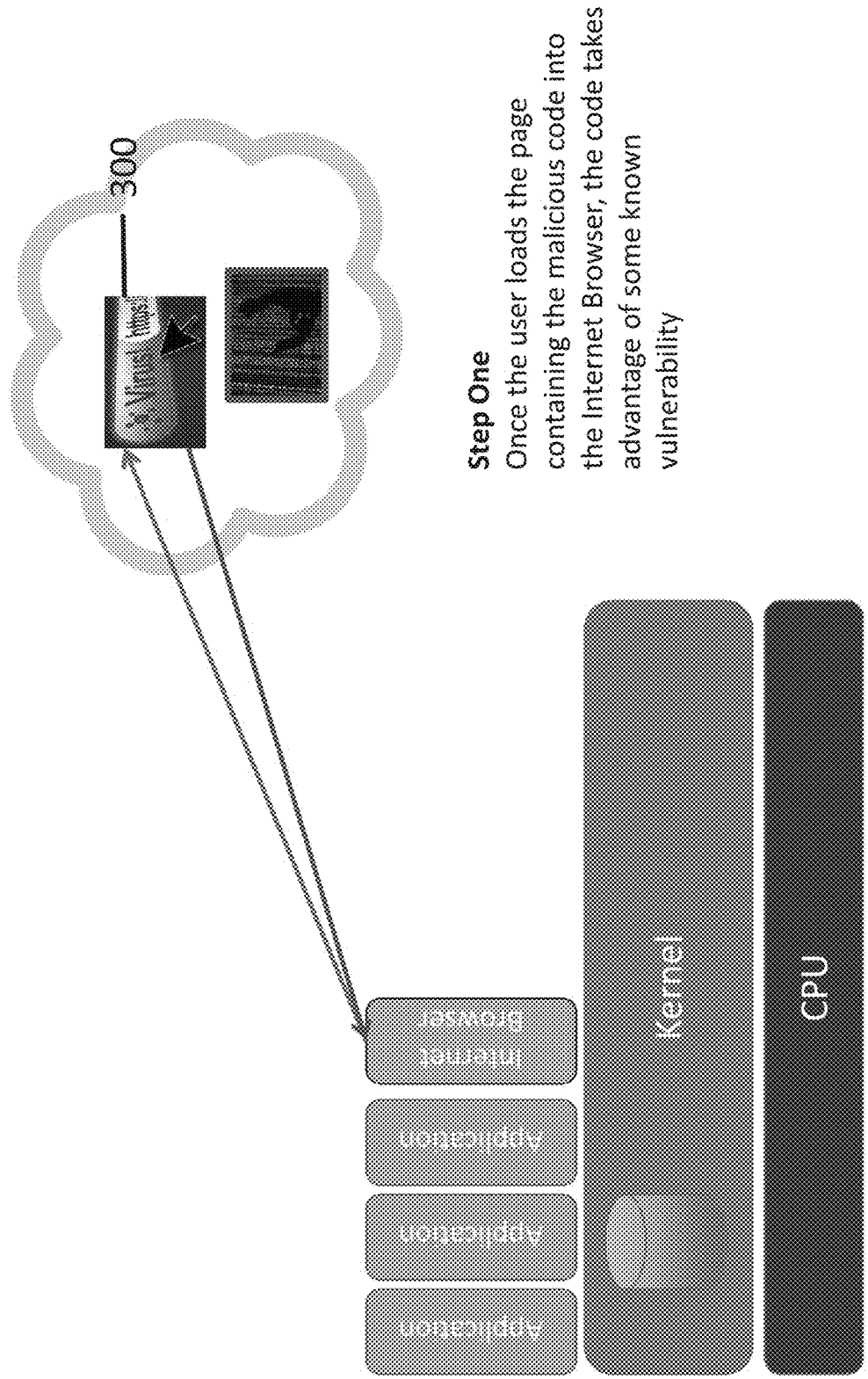
FIG. 3 is a block diagram of a system of the prior art, during a step in an exemplary malicious attack scenario.

Referring to FIGS. 2 and 3, in this example, malicious software 300 injects itself into a running instance of an Internet browser through a vulnerable condition in either the running code of browser or a third-party plug-in that is running within the browser. This is a common outcome and technique for phishing attack destinations and malicious websites. The goal of this example malicious software is to exfiltrate copies of any PDF files that are accessible to the user of the browser and deposit them on a remote server.

Attack Type Description

Figure 4:
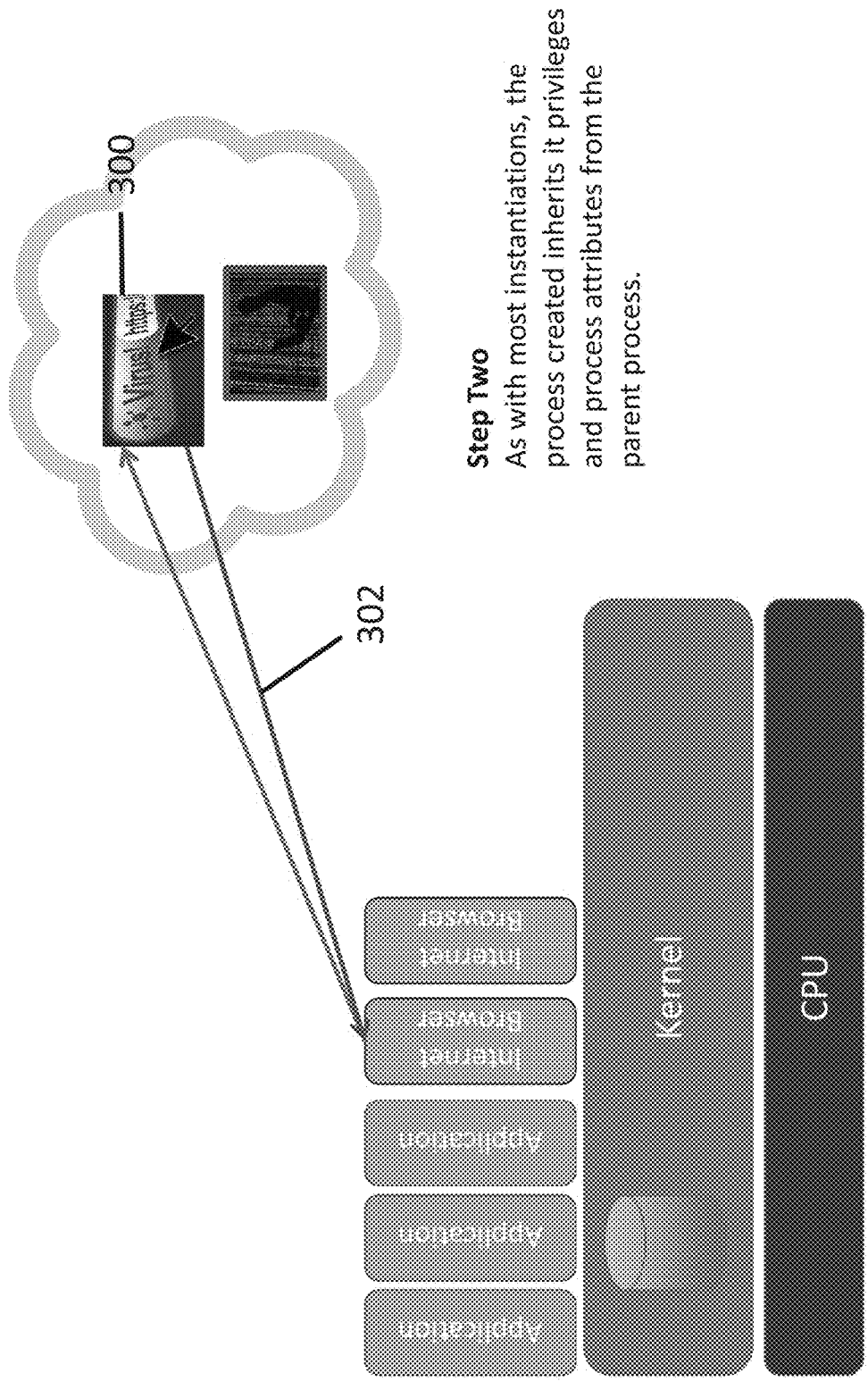
FIG. 4 is a block diagram of a system of the prior art, during a step in an exemplary malicious attack scenario.

As shown in FIG. 4, the technical example exploit attack technique discussed is called process injection 302. In general, a process injection attack takes advantage of a vulnerability affecting an executing program in order to replace actively running legitimate application code with malicious code in order to mask the malicious behavior by running it in the context of an expected or trusted process.

In this popular form of attack, once the malicious code is executing, these are the common steps to exploiting the system:

Create a new process in a suspended state, a common way to create a new process and suspend execution until needed.

Figure 5:
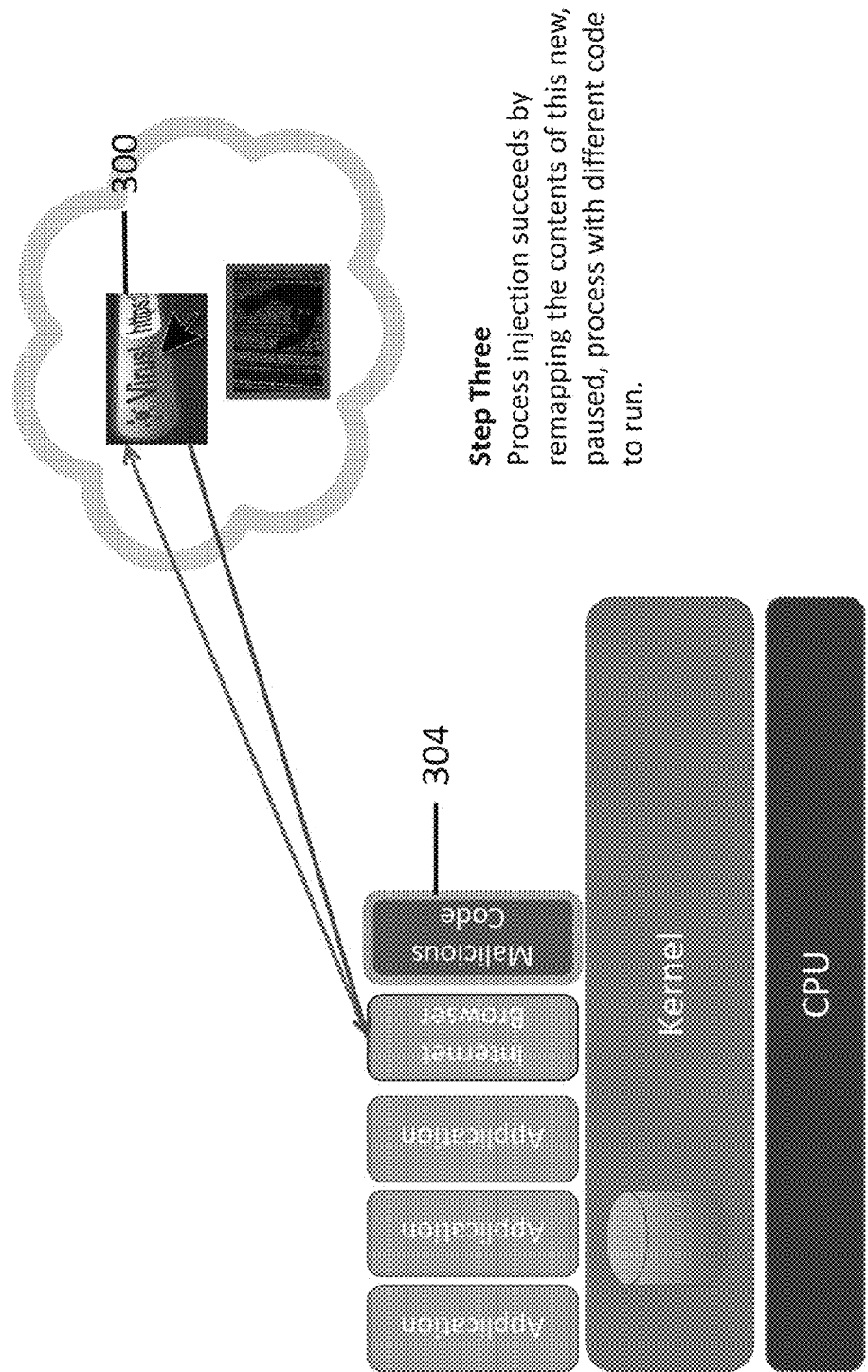
FIG. 5 is a block diagram of a system of the prior art, during a step in an exemplary malicious attack scenario.

As shown in FIG. 5, the existing process's memory space is mapped with code from the malicious executable, and then resumes execution from the newly mapped malicious program 304. The new process will now be executing the malicious code, but within the context of the originally targeted legitimate executable.

The malicious code then attempts to locate the limited functions required by the malicious executable, either by actually attempting their execution while watching for failures, or by searching the import table in the shared memory of the corrupted executable. The code 304 may then attempt to download additional functions or libraries necessary to augment existing functionality within the malicious code in order to load that functionality for use.

Figure 6:
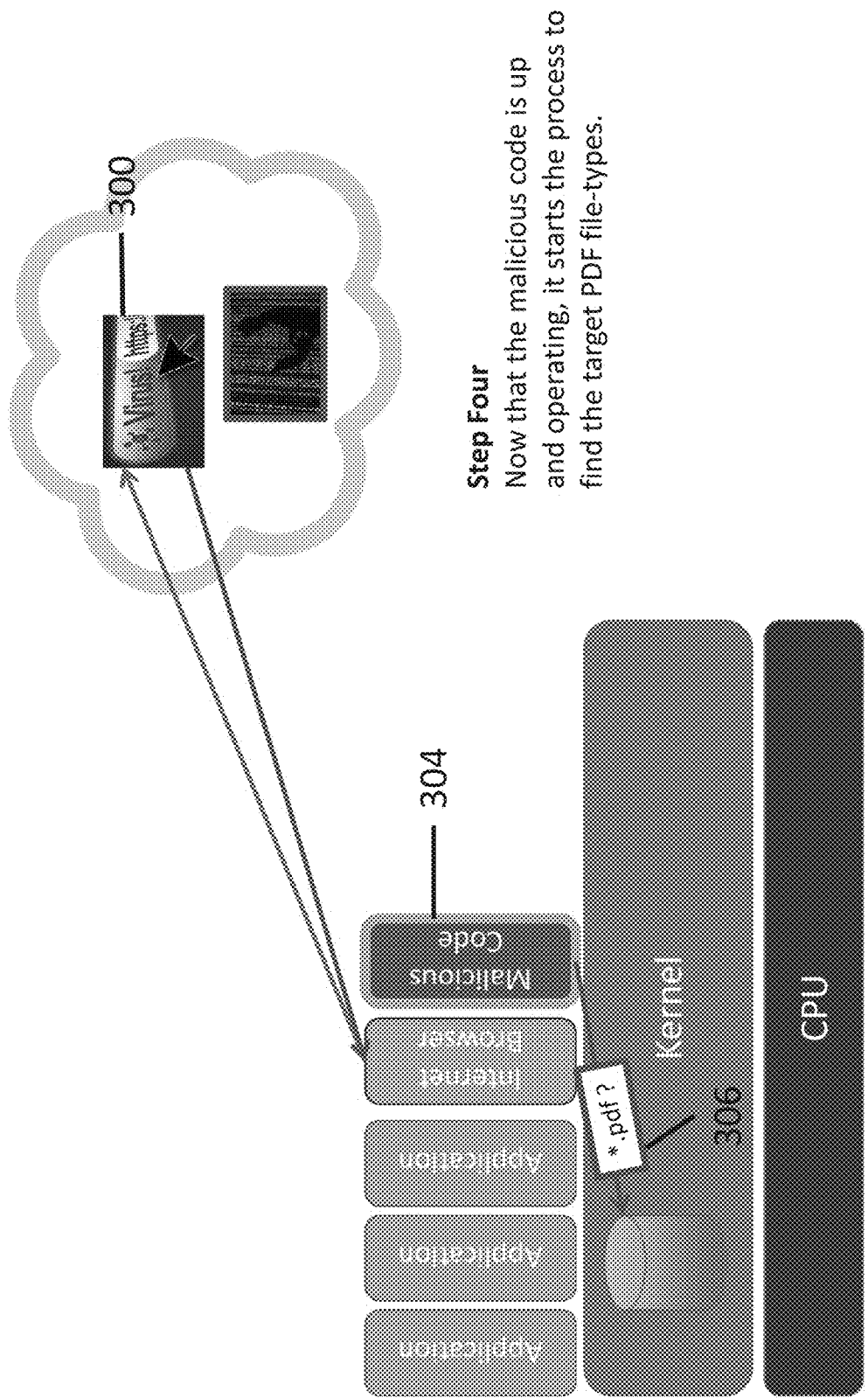
FIG. 6 is a block diagram of a system of the prior art, during a step in an exemplary malicious attack scenario.

Turning now to FIG. 6, in this specific example, the goal is the identification and exfiltration of all accessible PDF files. To do this, the malicious code will attempt to identify and enumerate all physical and logical drives that are accessible to the trusted context of the corrupted process.

This list is then searched for occurrences of the file type PDF 306.

Figure 7:
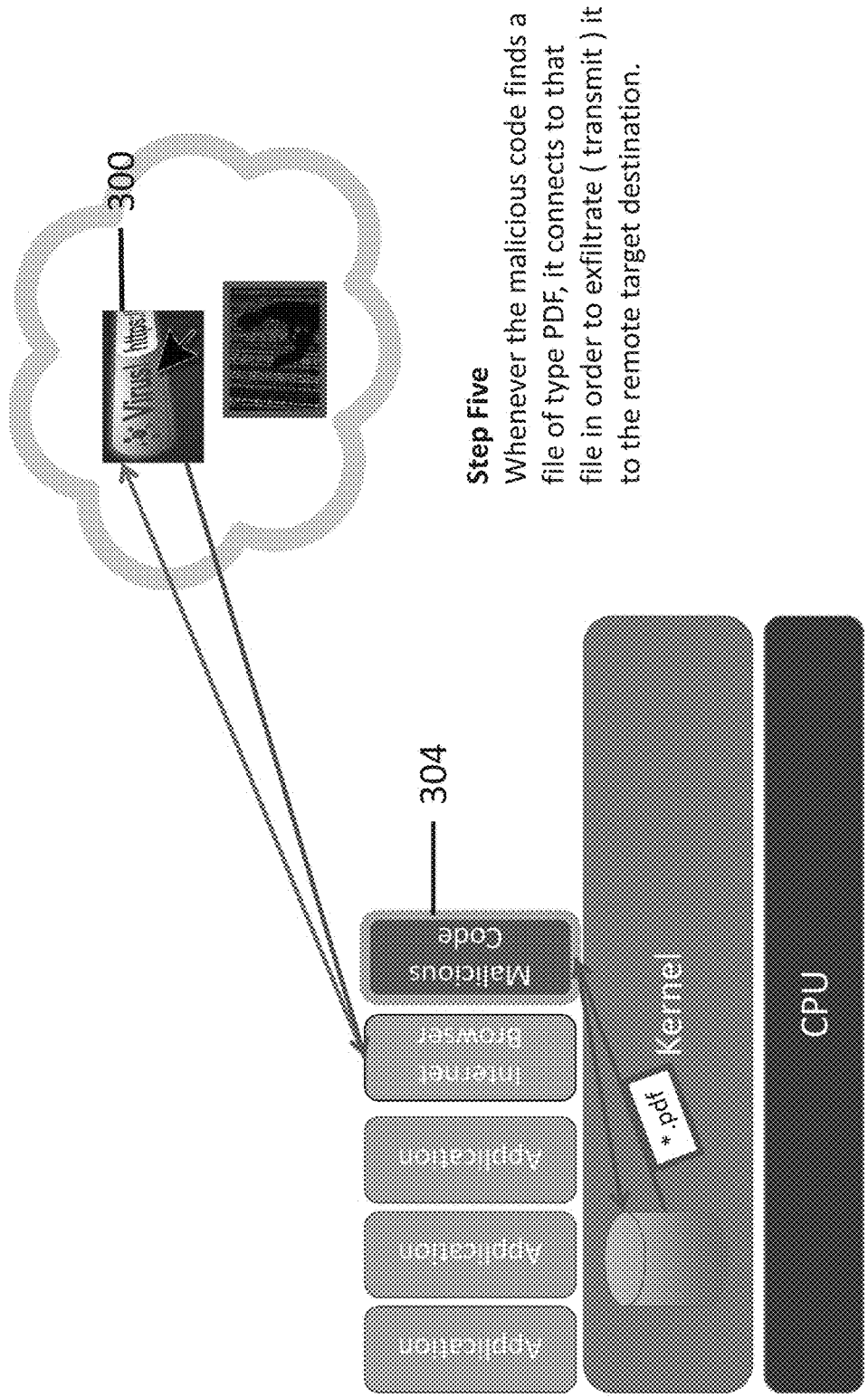
FIG. 7 is a block diagram of a system of the prior art, during a step in an exemplary malicious attack scenario.
Figure 8:
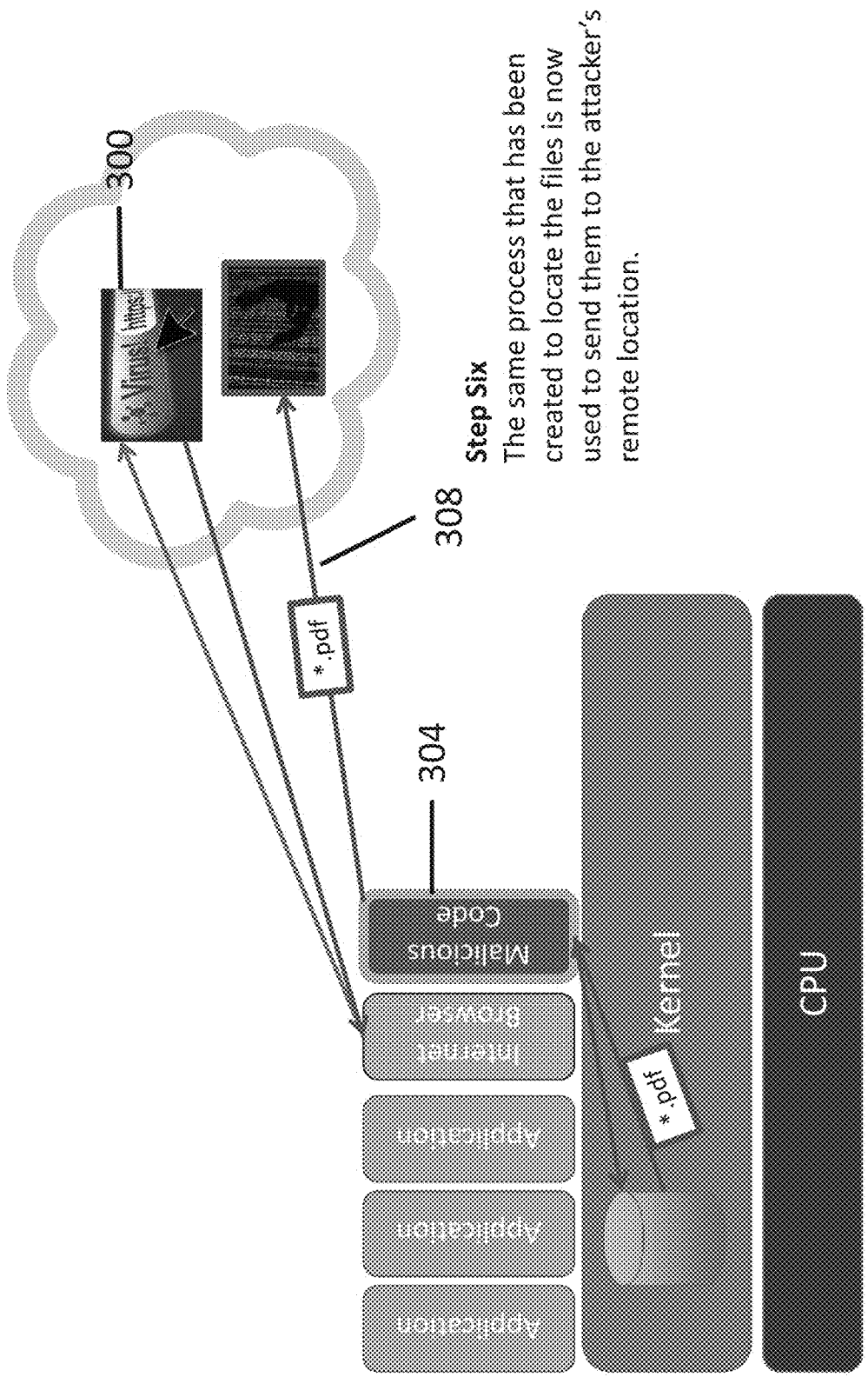
FIG. 8 is a block diagram of a system of the prior art, during a step in an exemplary malicious attack scenario.

As shown in FIGS. 7 and 8, on each successful identification of a PDF file, the malicious code then uses the existing HTTP capability of the corrupted Internet browser to send 308 the contents of that file to the address of a receiving malicious site using standard HTTP POST or GET requests.

Example II

Figure 9:
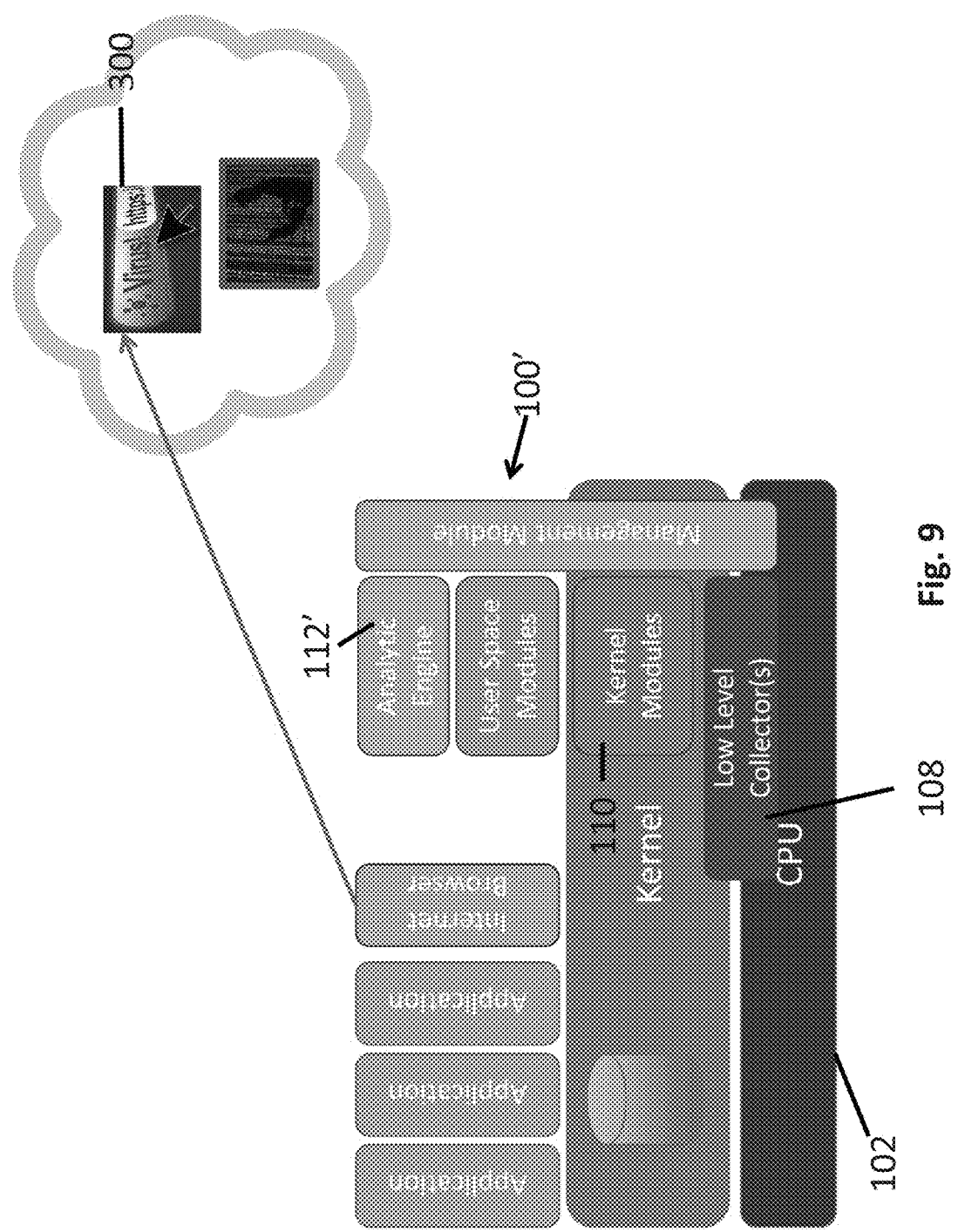
FIG. 9 is a block diagram of the embodiment of FIG. 1B, during a step in an exemplary operation during a malicious attack scenario.
Figure 10:
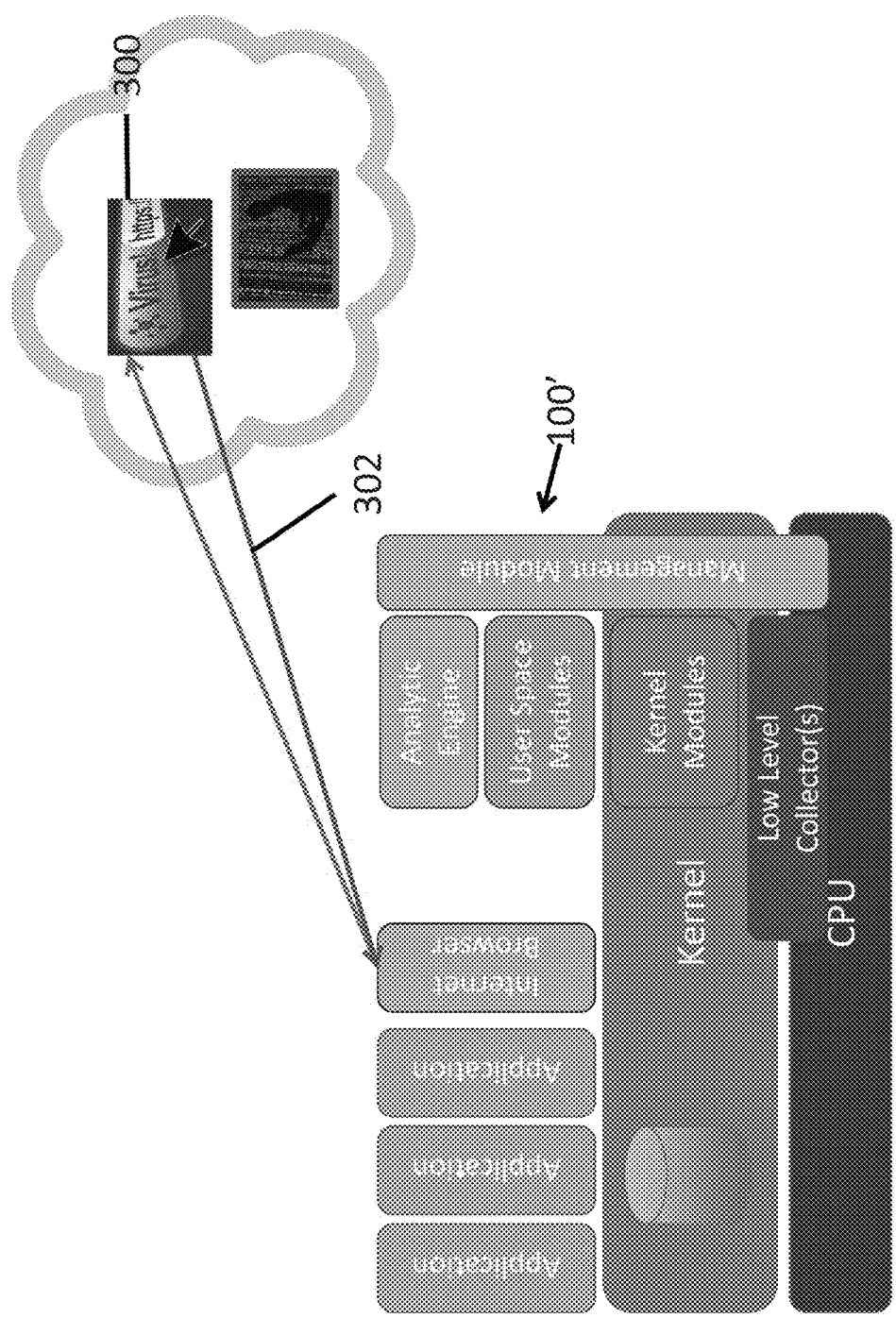
FIG. 10 is a block diagram of the embodiment of FIG. 1B, during a step in an exemplary operation during a malicious attack scenario.
Figure 11:
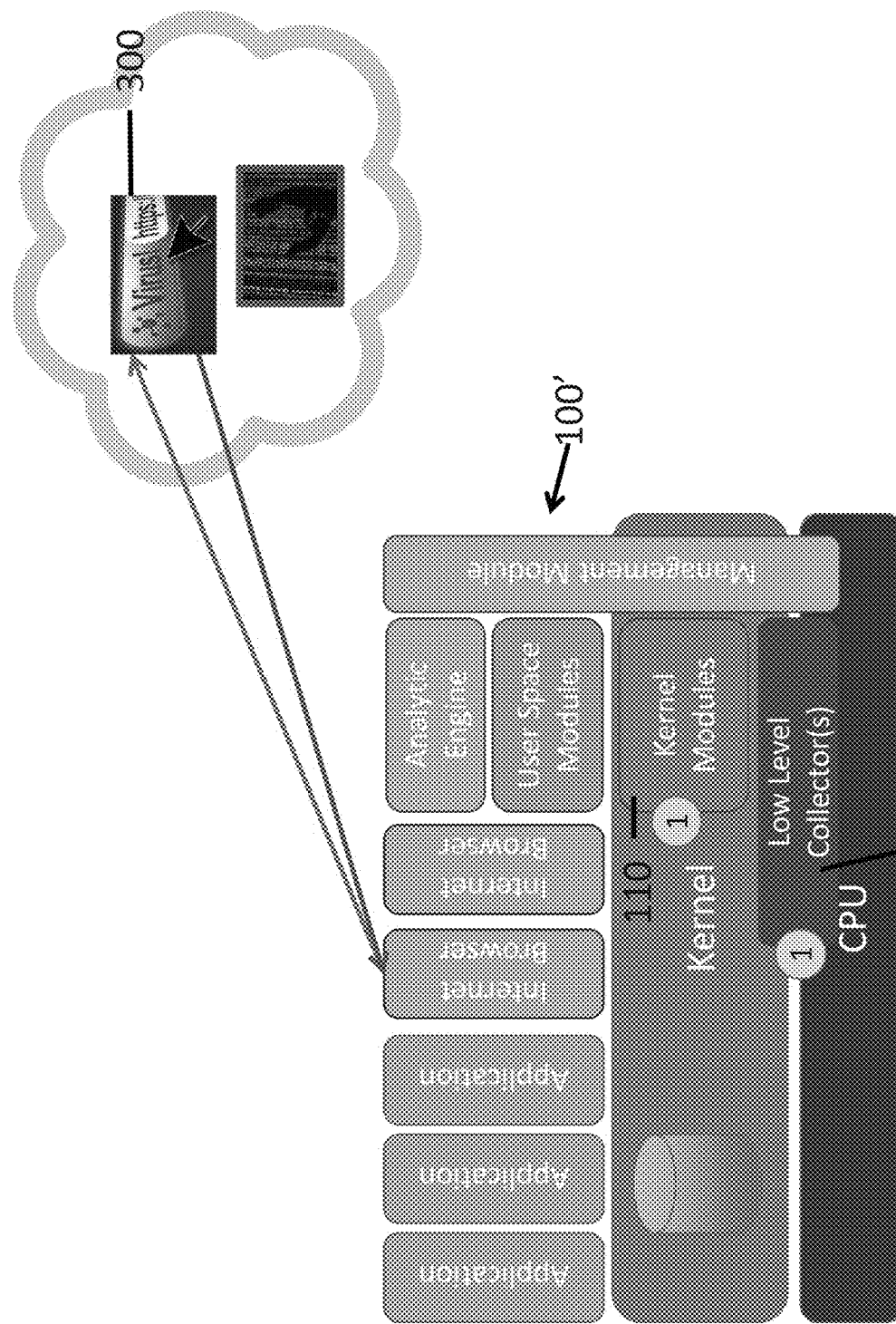
FIG. 11 is a block diagram of the embodiment of FIG. 1B, during a step in an exemplary operation during a malicious attack scenario.

Referring to FIGS. 9-16, system 100' initiates components in various sections of the system. As shown in FIG. 9, at its base, the low-level collector (e.g., microvisor) 108 intercepts the lowest level commands passing between the kernel 104 of the operating system and the actual hardware (e.g., CPU) 102. The microvisor 108 acts both as observer to inform actions, and as defender of the entire system 100'. The kernel modules 110 gather information about ongoing system operation, and the analytic engine 112' relates alerts to rules and actions. These components are all managed by the management module 114. Once so configured, as shown in FIG. 10, when the Internet browser visits the malicious site 300, and malicious code from site is returned at 302, the results are much different than as shown and discussed hereinabove with respect to the prior art. Turning to FIG. 11, system 100' operates so that at the time of the creation of a new process by the Internet browser, the virtual address space of critical or identified processes is intermediated by one of the low level collectors 108 and the Kernel/OS module 110. For example, among the default rules within the system 100' is a rule to observe Internet browsers for certain activities, like spawning new processes. So in this example, when the browser spawns a new process at the request of the malicious code, that action is noted and identifying information is retrieved from the kernel and microvisor (collector) modules 110 and 108, respectively, to be sent to the analytic engine 112'.

Figure 12:
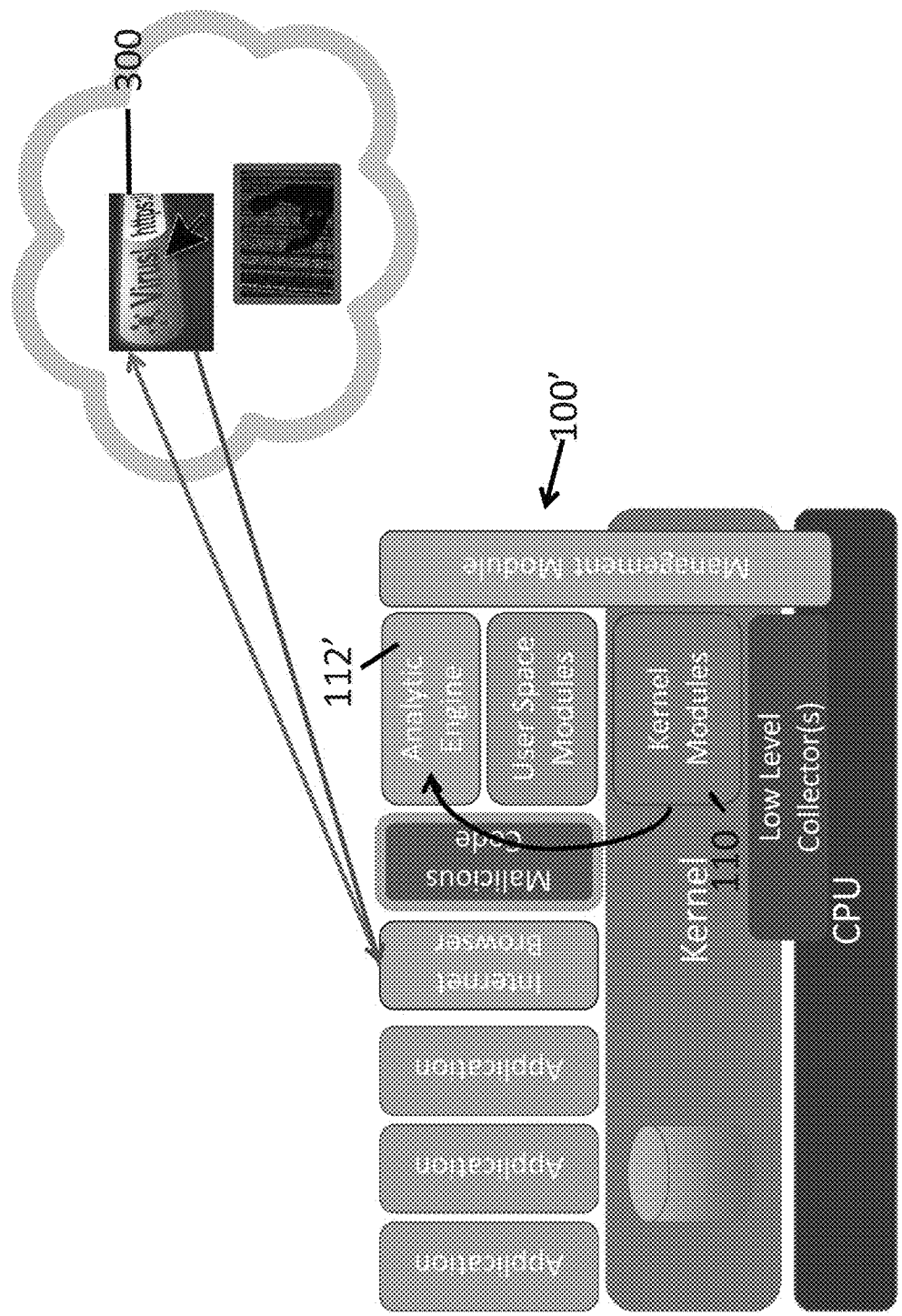
FIG. 12 is a block diagram of the embodiment of FIG. 1B, during a step in an exemplary operation during a malicious attack scenario.

As shown in FIG. 12, the collector interacts with a kernel level memory subsystem watching process level loading and unloading of memory-mapped regions and passes the captured intermediated call information to the Analytics Engine, where both the existing and new processes invoked are named, a hashed fingerprint of the virtual memory space is taken, and any changes to critical code or data pages are captured. For example, remapping a new process is an unusual operation from within a browser, and as a result, particular embodiments include a default kernel module rule that identifies it. When the process clears the existing browser context and replaces it with new code (e.g., with the malicious code), the kernel module 110 identifies the behavior and sends an alert which includes the process identification and behavior to the analytic engine 112'.

Figure 13:
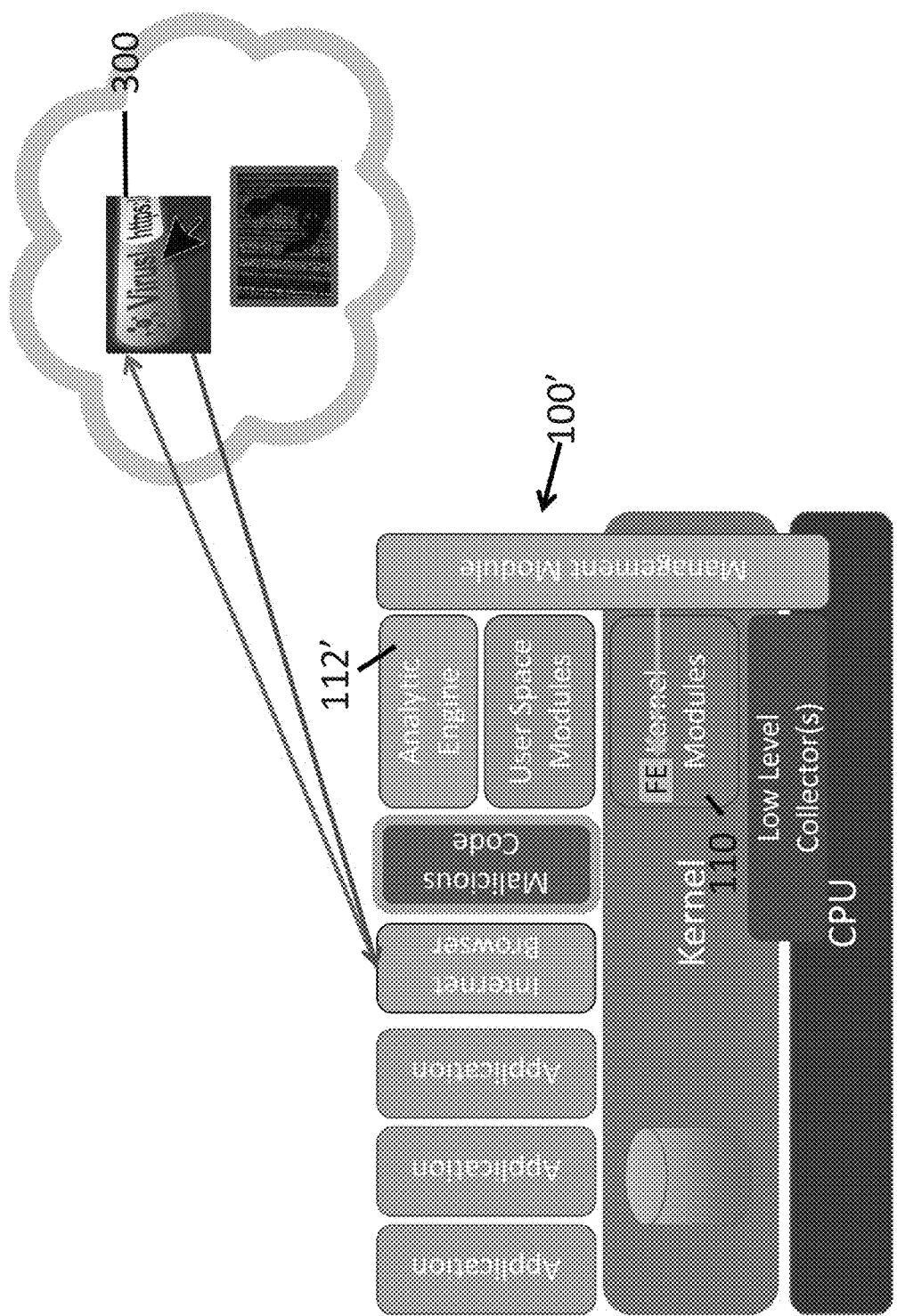
FIG. 13 is a block diagram of the embodiment of FIG. 1B, during a step in an exemplary operation during a malicious attack scenario.
Figure 14:
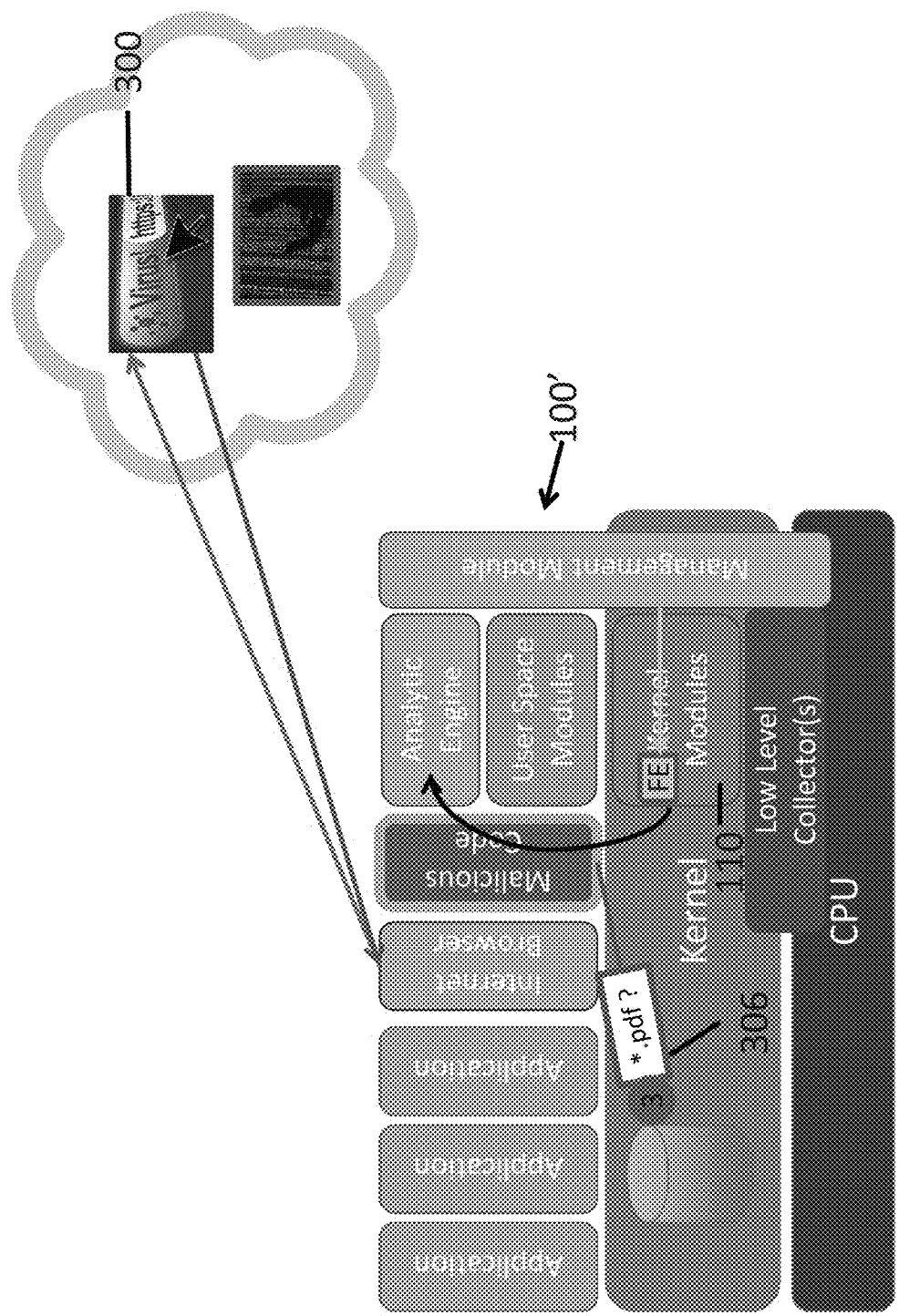
FIG. 14 is a block diagram of the embodiment of FIG. 1B, during a step in an exemplary operation during a malicious attack scenario.

As shown in FIG. 13, the Analytics Engine 112' then adds additional observation capabilities to the kernel module to capture additional system events related to the targeted process. The relevant new capability in this case is to alert on any filesystem enumeration. This is a single additional capability in satisfaction of this example. Any primary Alert will typically pass multiple new capabilities to the kernel or collector observation capability. In the example shown and discussed above, the remapping of the browser image is sufficiently suspicious that the Analytics Engine 112' will continue its correlation activity using additional information gathered from the kernel and microvisor modules 110, 108, looking for conclusive malicious behavior. In this example, the next element of the rule would trigger on filesystem enumeration FE, which is seen through the kernel module(s) 110.

When the malicious code performs the call to attempt enumeration of the discovered drives, e.g., to search for occurrences of the file type PDF at 306, a new flag in the kernel will be triggered, and an Alert will be sent to the Analytics Engine.

Figure 15:
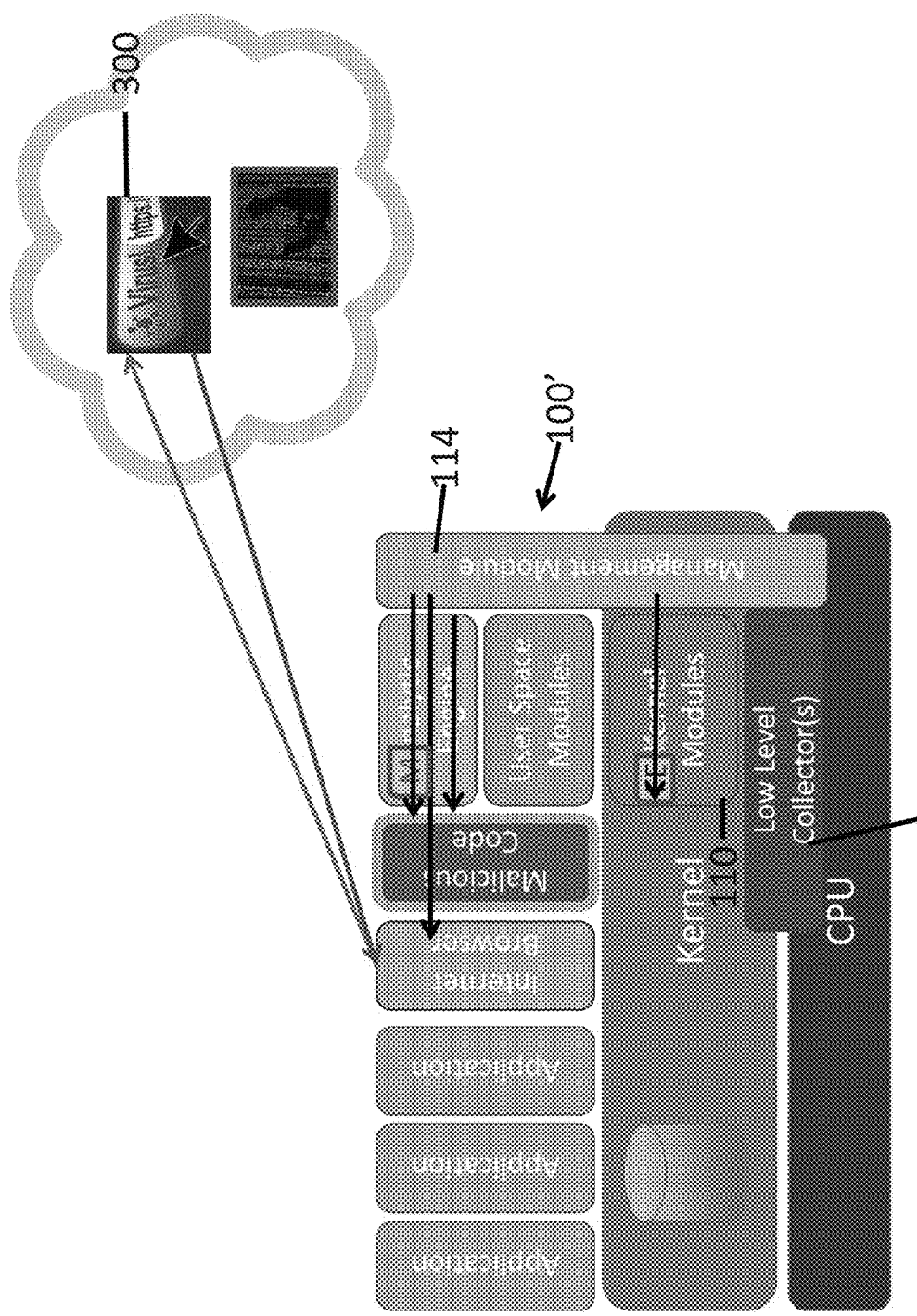
FIG. 15 is a block diagram of the embodiment of FIG. 1B, during a step in an exemplary operation during a malicious attack scenario.
Figure 16:
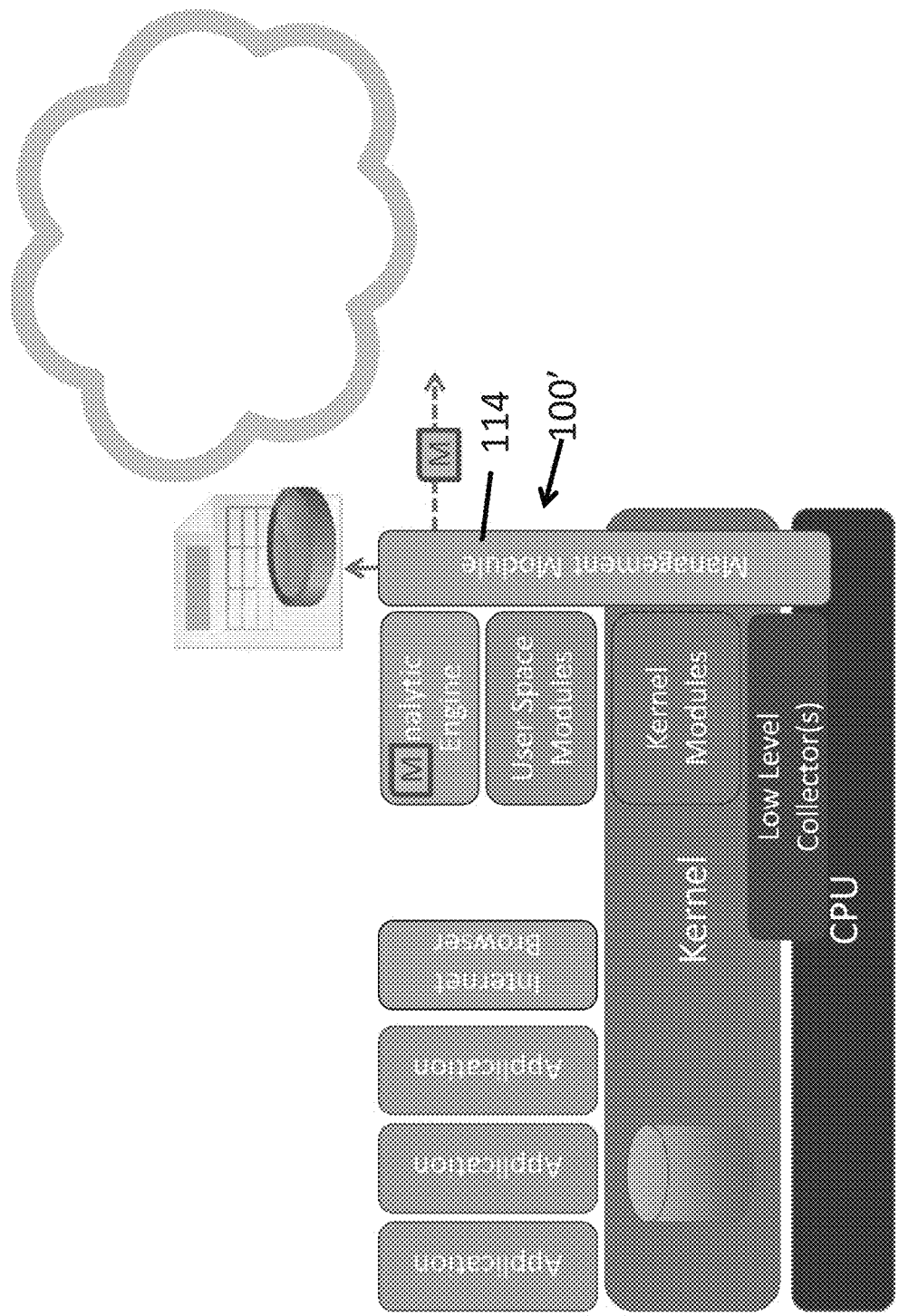
FIG. 16 is a block diagram of the embodiment of FIG. 1B, during a step in an exemplary operation during a malicious attack scenario.

Receiving this second related Alert, the Analytics Engine will, according to response rule directives, terminate. In the example shown in FIG. 14, when the malicious code now tries to enumerate the file system as it looks for PDF files at 306, the kernel module(s) 110 recognize the prohibited request as a result of the new rule and cancels the request. The system may then potentially restart the parent Internet browser process (FIG. 15). For example, as shown in FIG. 15, with the enumeration stopped, the Analytic Engine 112' now knows that the code in question was malicious, and that the Internet Browser image in memory has been corrupted. Using a response defined in its rulebase, the Management Module 114 terminates the malicious process and respawns the Internet Browser from a clean image. The Management Module 114 also leaves identifying information M in the Analytic Engine 112' for future use and resets both kernel and microvisor modules 110, 108, clearing the malicious code from memory, for normal operation (FIG. 16). In the example shown in FIG. 16, the Internet browser has now been respawned from the clean binary image on the system. The Management Module sends a report to the appropriate console, and also forwards information about the thwarted attack to any other protected system on the subnet.

The Analytics Engine will also add the signature of the remapped binary to rules memory, allowing for the next attack of the same type to be immediately interdicted at time of attempted process memory remapping.

The Analytics Engine will also report on any or all of these events to the reporting console (e.g., a user interface generated by Management Module 114 depending upon the configuration of the particular system.

Turning now to FIGS. 17-20, particular embodiments of the present invention provide a multi-level analysis, in which data capture takes place initially at the time of loading an executable into memory. Gathering select attributes of the target executable object, i.e., a predictor, trained through otherwise conventional machine learning (ML), applies a first check to help discern good software from bad software. At the same time, these attributes are retained for later use in training and testing future models (predictors), having been tagged with a unique identifier for the executable, the local system, and the organization. In particular embodiments, this data capture takes place in real-time, creating an ongoing stream of information about known good and malicious software that is then received and stored at one or more central analysis locations.

In particular embodiments, the aggregated received information is then used, in combination with similar streams that include feature information (attributes) derived from malicious samples, to create a new set of training data. This new training data leverages machine learning to develop new and more accurate predictive models nightly, to ensure that protected systems will benefit from the most current understanding of malicious software. These new predictive models maintain effectiveness in differentiating software with features and behaviors consistent with valid software and authorized user operation, from software with features and behaviors consistent with malicious software, for the purposes of blocking, alerting, monitoring, and interdicting adversarial and/or unauthorized operations and communicating newly observed patterns in a network of system monitors. This new approach to consistent and timely update of training information and models is referred to herein as responsive machine learning.

The present inventors have recognized that previously developed implementations of machine learning applied to the problem of malware detection have lost a material level of efficacy over time, in terms of missing new forms of malware or generating false positives in which beneficial software is erroneously characterized as malicious. In order to maintain accuracy and avoid false identifications, the present inventors have recognized the need to efficiently train and deliver highly accurate models that can be integrated within various embodiments of the present invention. These inventors have met this need by creating the new approach to machine learning shown and described herein.

Figure 19B:
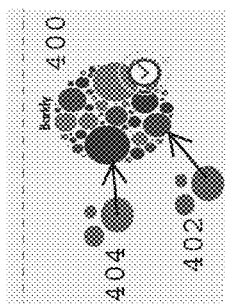
FIG. 19B is a graphic similar to that of FIG. 19A illustrating aspects of the embodiment of FIGS. 17 and 18.
Figure 19A:
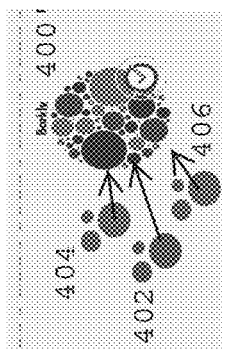
FIG. 19A is a graphic illustrating aspects of the embodiment of FIGS. 17 and 18.

As best shown in FIGS. 19A and 19B, a base model 400 is generated on a regular basis, which includes a general set of both known good software 402 and known bad software 404, to form a corpus with which a machine learning model may be created and/or trained. The present inventors have recognized, however, that while a set of bad software is "knowable", it is difficult if not virtually impossible to create a universal set of good software that would be applicable to all users. This is because the examples of what is "good" are often organization specific, sometimes even specific to particular endpoints within the organization. Software considered "good" for one organization is not necessarily good for all organizations. To account for this, particular embodiments of the invention are able to incorporate customer specific learning, e.g., customer specific 'goodware' 406 as determined by particular customers on a customer by customer basis, to a customer/endpoint specific data model 400'. A customer specific data model 400', also referred to as a machine learning model/rulebase ("ML Model"), may be created and customized for any number of individual customers/endpoints. In addition, in particular embodiments, ML Model 400' is tested on a regular basis against past and future data feeds ("prediction feeds") received from the user machine/endpoint, e.g., via management module 114' (FIG. 17), to ensure that a specified endpoint is only updated when a new ML Model 400' is generated that represents an improvement relative to the existing ML Model. In particular embodiments, a new ML Model 400' is determined to represent an 'improvement' if it increases the predictive characteristics through a set of customizable measurements of precision, recall, sensitivity, accuracy, and specificity. It should be noted that the terms 'sensitivity' and 'specificity' are used consistently with their conventional statistical definitions, and refer to measures of the performance of a binary classification test, also known in statistics as classification functions. Sensitivity (also referred to as the true positive rate, the recall, or probability of detection) measures the proportion of positives that are correctly identified as such. Specificity (also referred to as the true negative rate) measures the proportion of negatives that are correctly identified as such.

Figure 17:
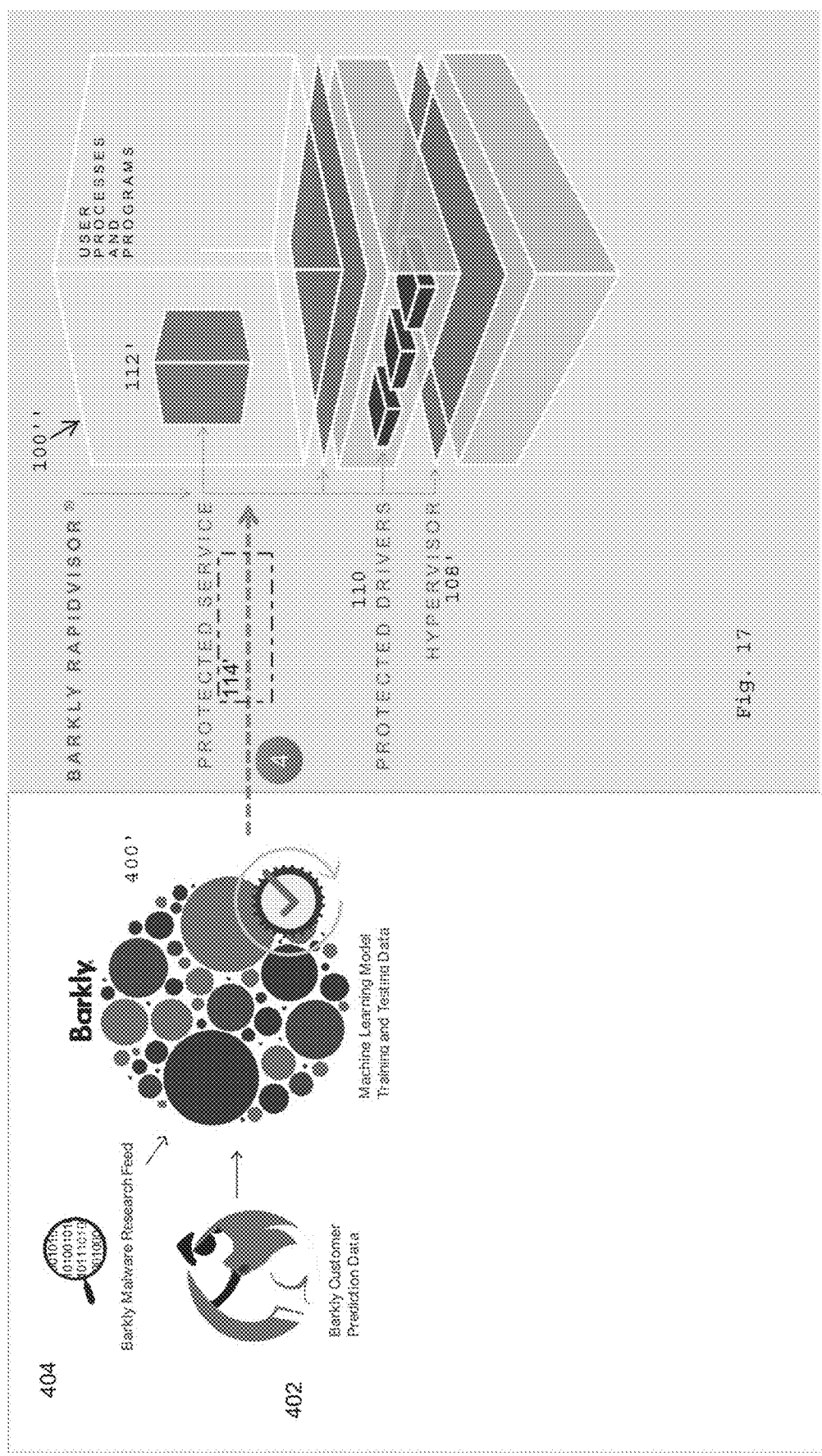
FIG. 17 is a functional block diagram of an alternate embodiment of the present invention.

Referring now to FIG. 17, this inventive approach allows for efficient scaling to large numbers (e.g., thousands or millions) of endpoints quickly, e.g., in substantially real-time, in part because new training and delivery of models, e.g., via management module 114', does not have to be applied universally to all endpoints. Counterintuitively, rather than being unwieldy and data intensive, the present inventors have found that providing such customized models requires less processing overhead and provides better results than conventional approaches which attempt to generate a single model that is universally applicable to large numbers of diverse users. It is suspected that one reason for this counterintuitive result is the ability to focus the ML Model on the relatively narrow needs of a single user rather than the broader needs of large numbers of diverse users. Another factor contributing to the unexpected result of this customized approach being more efficient and less data intensive than conventional approaches is the aforementioned collection of only targeted data from the end user/endpoints. As discussed hereinabove with respect to FIGS. 9-16, rather than attempting to intermediate every call, the Analytic Engine 112' and low level collector/hypervisor 108, 108' are configured to intermediate and collect a strategically selected subset of available data, and to then selectively enlarge or contract the predetermined selection (e.g., increase or decrease the number) of first tier calls (and second tier calls) to respectively increase or decrease specificity of the threat analysis as needed. This approach effectively limits the amount of data being routinely processed to facilitate efficiency and reduce processing overhead. The limited nature of this data collection, and the associated low processing overhead requirements, enables collection of data from individual endpoints substantially in real-time, e.g., on a daily or weekly basis. This limited subset of data, and the fact that it's collected frequently, substantially in real-time, rather than biannually or annually, means that the amount of data collected from any particular endpoint at any particular time is relatively small. This, in turn, enables the collected data to be efficiently added to the ML Model 400' for that specific node (endpoint/customer), e.g., in real-time. The new training based on this newly added data may thus be isolated to a specific node, and then applied to the node when the predictive analytics show that (1) the existing model is no-longer within a predetermined measurement threshold, and (2) that the new model will move that node back into compliance.

This new model is able to be automatically pushed to existing running instances of the process, so the customer receives the benefit of the new updated model without any disruption. These pushed updates occur without disruption because they don't require a re-boot of the customer machine/endpoint at each update. The instant inventors have recognized that manipulations at low levels of the system, e.g., in kernel and hypervisor space such as to update device drivers or the operating system, ordinarily require a re-boot of the system. These embodiments, however, enable the integration of new functionality into existing components of the kernel of the OS without forcing a re-boot of the system because the low level collector/hypervisor 108' intermediates that relationship, with the prediction program running in user space (e.g., within the analytic engine 112') as discussed hereinabove. This prediction program gets called out of kernel space, and the fact that the kernel can make that call to get kernel level functionality from user space (which as discussed is automatically updated in user space via new ML Model 400') allows the protection to be changed without disrupting the user.

Turning now to FIG. 18, during operation of these embodiments, a user program makes a request to the operating system to begin execution at 440. Program execution is paused/intermediated at 442 by the low level collector, e.g., in the form of kernel hooks supplied by the OS manufacturer (e.g., Microsoft), and/or hypervisor 108', which sends the intermediated requests to analytic engine 112' as discussed hereinabove. At 444, the ML Model 400', e.g., loaded into analytic engine 112', extracts and processes the intermediated program executable information to determine whether the intermediated requests should be permitted to proceed. The engine 112' then notifies the kernel subsystems 110 whether execution should continue (in the case of goodware). Otherwise, engine 112' notifies a user space control block to terminate the process and report to the SaaS management platform (Management Platform Server) 450, e.g., via management module 114' (FIG. 17). At 446, executable information (e.g., first and/or second tier call IDs, etc.,) used by ML Model 400' in engine 112' is streamed via management module 114' (FIG. 17) to the Management Platform Server 450 to be used for endpoint (user) specific ML Model creation/updating as discussed above. Once a new model has been tested and shown to represent an improvement, e.g., by increasing accuracy, precision, etc., as discussed hereinabove, a new ML Model 400' will be delivered to engine 112' as shown at 448. As discussed hereinabove, this new ML Model effectively updates the protection to system 100" in real-time without requiring a re-boot. This ability to update without a re-boot is possible because the ML Model resides in user space (e.g., within Analytic Engine 112') as shown, rather than at the OS level, with OS level execution being passed to the ML Model by the OS kernel hooks and/or hypervisor 108'.

Figure 20:
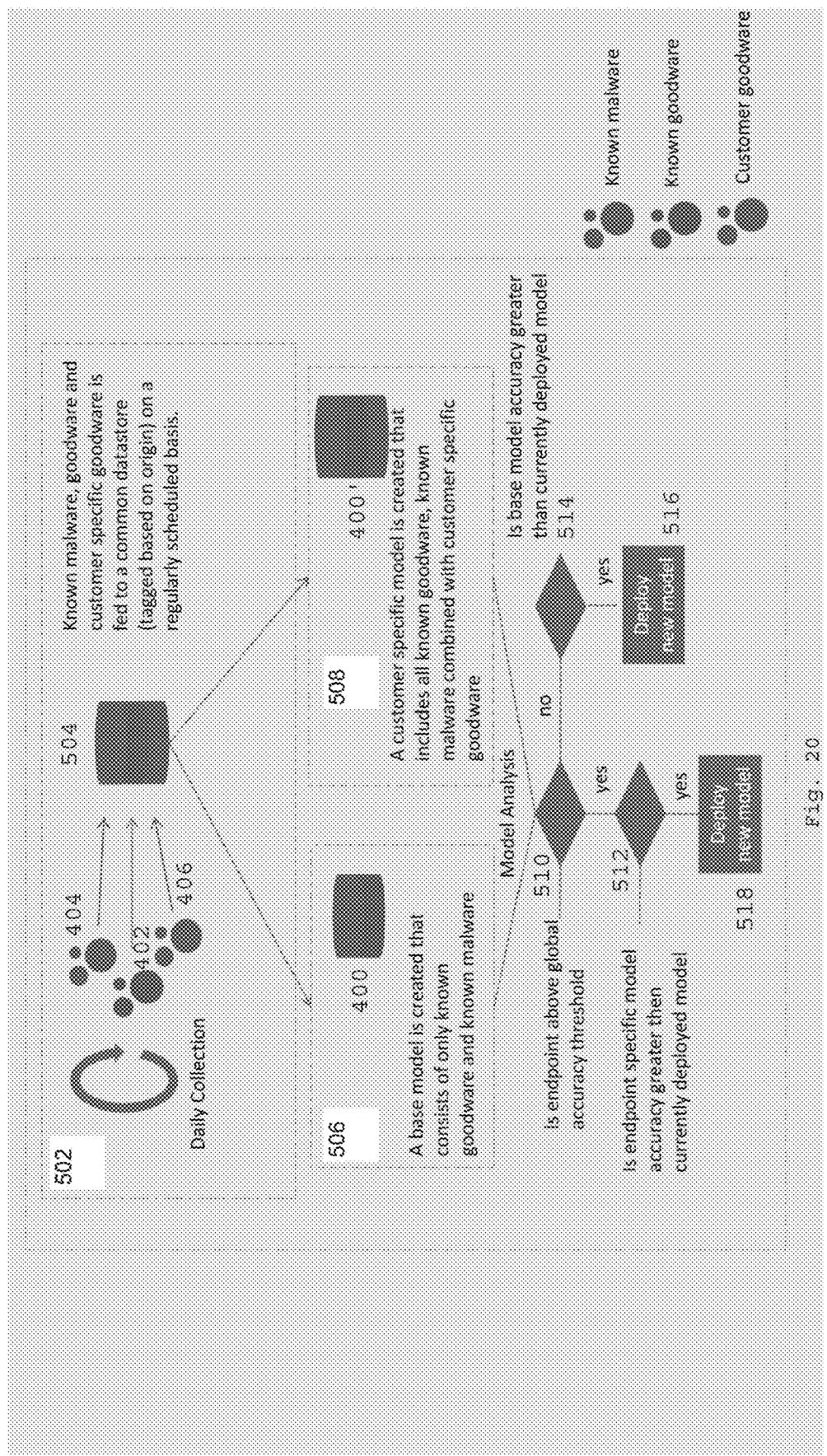
FIG. 20 is a flow chart of a process in accordance with the embodiment of FIGS. 17-19

Turning now to FIG. 20, a representative method 500 for creating, updating, and deploying an ML Model 400' in accordance with embodiments of the present invention is shown and described. At 502, known goodware 402, malware 404, and customer specific goodware 406 is fed to a common data store 504 on a regularly scheduled basis. In particular embodiments, this data 404, 402, 406 is tagged based on origin, e.g., based on source and/or arrival date/time.

At 506, data in data store 504 is used to create base model 400, which in particular embodiments includes only known goodware 402 and known malware 404. As mentioned hereinabove, base model 400 serves as a corpus with which Analytic Engine 112' (FIGS. 17, 18) may be trained. At 508, customer/endpoint specific data model 400' is created, which includes the known goodware 402, known malware 404 as well as customer specific goodware 406 as determined by particular customers on a customer by customer basis, to a customer/endpoint specific data model 400'.

As discussed hereinabove, data store 504 is updated on a regular basis, e.g., using the aforementioned prediction feeds of data 402, 404 and/or 406, and which are then used to periodically update base model 400 and ML Model 400'.

At 510, base model 400 and ML Model 400' are analyzed, to determine whether the ML Model 400' performs at or above a predetermined accuracy threshold. If it does, then the ML Model 400' accuracy is compared to the accuracy of the model currently deployed at the particular customer/endpoint for which the ML Model 400' was created. If the ML Model 400' accuracy is greater than that of the current model, then the current model is replaced with the ML Model 400'. Alternatively, if the answer at 510 was no, then base model 400 is compared with the current model, and if the base model accuracy is greater than that of the current model, then the current model is replaced at 516 with the base model 400. Steps 502-518 are repeated periodically, e.g., as updated data 402, 404 and/or 406 becomes available, to help ensure that customers/endpoints are continuously provided with up to date protection, e.g., on a substantially real time basis.

Embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A security system for securing and responding to security threats in a computer having a Central Processing Unit (CPU), a Kernel/Operating System, and a plurality of software applications, the system including:
 a low-level data collector module in the form of a hypervisor, implemented with the CPU, configured to intermediate a predetermined selection of first tier calls between the CPU and the Kernel/Operating System without creating hardware-isolated virtual machines for each task performed by a user, and to store identifying information pertaining to the intermediated first tier calls (first tier call IDs) in a data store, the hypervisor being configurable in real-time to selectively enlarge or contract the predetermined selection of first tier calls;
 an Analytic Engine, implemented in user space of the computer, configured to aggregate and map the stored first tier call IDs to a machine learning (ML) Model to generate a threat analysis, the ML Model including patterns of first tier call IDs associated with identifiable security threats;
 the Analytic Engine being configured to selectively enlarge or contract the predetermined selection of first tier calls to respectively increase or decrease specificity of said threat analysis;
 the Analytic Engine being further configured to implement one or more of a plurality of responsive actions in response to said threat analysis; and
 a Management Module communicably coupled to the ML Model, the low-level data collector module, and the Analytic Engine, the Management Module configured to generate a plurality of user interfaces accessible by a user computer communicably couplable to the system, the user interfaces configured to enable a user to update the ML Model and configure the low-level collector module and the Analytic Engine.

2. The system of claim 1, wherein the Analytic Engine is communicably couplable to a Management Platform Server and is further configured to transmit the first tier call IDs to said Management Platform Server in real-time via the Management Module.

3. The system of claim 2, further comprising the Management Platform Server configured to receive and aggregate the first tier call IDs for said computer, to generate a New ML Model using the aggregated first tier call IDs, to determine whether the New ML Model represents an improvement in accuracy relative to the ML Model, and upon determination that the New ML Model represents said improvement in accuracy, transmit the New ML Model to said Analytic Engine.

4. The system of claim 2, further comprising receiving at the Analytic Engine, a New ML Model from the Management Platform Server, wherein the ML Model is updated in real-time without requiring a re-boot of the computer.

5. The system of claim 4, further comprising;
 a Kernel Module, implemented with the CPU, configured to intermediate a predetermined selection of second tier calls between the Kernel/Operating System and the applications, and to store identifying information pertaining to the intermediated second tier calls (second tier call IDs) in the data store;

the Analytic Engine being configured to aggregate and map the stored first tier call IDs and second tier call IDs to the ML Model, to generate said threat analysis, the ML Model including patterns of first tier call IDs and second tier call IDs associated with identifiable security threats;

the Analytic Engine being further configured to selectively enlarge or contract the predetermined selection of second tier calls to respectively increase or decrease specificity of said threat analysis;

the Management Module being communicably coupled to the Kernel Module, and the user interfaces being further configured to enable a user to configure the Kernel module.

6. The system of claim 5, wherein the Analytic Engine is configured to implement one or more of a plurality of responsive actions including one or more of (a) process termination, (b) thread termination, (c) event and alert notification and logging, (d) user disablement, (e) network disconnection, and (f) process fingerprinting.

7. The system of claim 5, further comprising:

a user space module configured to collect a predetermined selection of user space data associated with the applications, and to store identifying information pertaining to the collected user space data (user space IDs) in the data store;

the Analytic Engine being further configured to aggregate and map the stored first tier call IDs, second tier call IDs, and the user space IDs to the ML Model, to generate a threat analysis, the rulebase including patterns of first tier call IDs, second tier call IDs and user space IDs associated with identifiable security threats; and the Analytic Engine being configured to selectively enlarge or contract the predetermined selection of first tier calls, the predetermined selection of second tier calls, and/or the predetermined selection of user space data to respectively increase or decrease the specificity of said threat analysis.

8. The system of claim 7, wherein the Analytic Engine is configured to automatically enlarge the predetermined selection of first tier calls, the predetermined selection of second tier calls, and/or the predetermined selection of user space data to increase the specificity of said threat analysis from a base level to one or more escalated levels when the threat analysis identifies a potential security threat.

9. The system of claim 8, wherein the Analytic Engine is configured to automatically contract the predetermined selection of first tier calls, the predetermined selection of second tier calls, and/or the predetermined selection of user space data to decrease the specificity of said threat analysis from the one or more escalated levels towards the base level once one or more of the plurality of responsive actions has been implemented.

10. The system of claim 7, wherein the predetermined selection of user space data includes one or more of (a) Application Mouse Activity, (b) Application Keyboard Activity, (c) System Logfile Activity, and (d) System Registry Fields.

11. The system of claim 5, wherein the predetermined selection of first tier calls include one or more events or calls for activity that would otherwise pass directly between the CPU, hardware devices, and/or the Kernel/Operating System.

12. The system of claim 11, wherein the predetermined selection of first tier calls includes one or more of (a) apicmod =Advanced Programmable Interrupt Controller Module, (b) gmmumod=Guest Memory Management Unit Module, (c) gpmmumod=Guest Physical Memory Management Unit Module, (d) idtmod=Interrupt Descriptor Table Module, (e) kymtrmod=Keyboard Monitor Module, (f) msmtrmod=Mouse Monitor Module, (g) mxmlmod=Mini XML Module, (h) nwmtrmod=Network Monitor Module, (i) prmtnmod=Preemption Module, and (j) udis86mod=udis86 Module.

13. The system of claim 5, wherein the predetermined selection of second tier calls include one or more events or calls for service or data between the applications and the Kernel/Operating System including scheduling and functional service delivery.

14. The system of claim 13, wherein the predetermined selection of second tier calls includes communications with one or more of a (a) Network Monitor Driver, (b) Registry Monitor Driver, (c) Filesystem Monitor Driver, (d) Process Monitor Driver, and (e) Process Governor Driver.

15. The system of claim 5, further comprising the data store and the ML Model.

16. The system of claim 15, wherein said data store is disposed remotely from the computer.

17. The system of claim 15, wherein the ML Model is disposed remotely from the computer.

18. A method for securing and responding to security threats in a computer having a Central Processing Unit (CPU), a Kernel/Operating System, and a plurality of software applications, the method including:

(a) intermediating, with a low-level data collector module in the form of a hypervisor implemented with the CPU, a predetermined selection of first tier calls between the CPU and the Kernel/Operating System without creating hardware-isolated virtual machines for each task performed by a user, and storing identifying information pertaining to the intermediated first tier calls (first tier call IDs) in a data store, the hypervisor being configurable in real-time to selectively enlarge or contract the predetermined selection of first tier calls;

(b) aggregating and mapping, with an Analytic Engine implemented in user space of the computer, the stored first tier call IDs to a machine learning (ML) Model, to generate a threat analysis, the ML Model including patterns of first tier call IDs associated with identifiable security threats;

(c) selectively enlarging or contracting, with the Analytic Engine, the predetermined selection of first tier calls to respectively increase or decrease specificity of said threat analysis;

(d) implementing, with the Analytic Engine, one or more of a plurality of responsive actions in response to said threat analysis; and (e) actuating a plurality of user interfaces, with a Management Module communicably coupled to the ML Model, to update the ML Model and configure the low-level collector module and the Analytic Engine.

19. The method of claim 18, further comprising communicably coupling the Analytic Engine to a Management Platform Server, and with the Analytic Engine, transmitting the first tier call IDs to said Management Platform Server in real-time via the Management Module.

20. The method of claim 19, further comprising receiving and aggregating, with the Management Platform Server, the first tier call IDs for said computer, generating a New ML Model using the aggregated first tier call IDs, determining whether the New ML Model represents an improvement in accuracy relative to the ML Model, and upon determining that the New ML Model represents said improvement in accuracy, transmitting the New ML Model to said Analytic Engine.

21. The method of claim 19, further comprising receiving at the analytic engine, a New ML Model from the Management Platform Server, wherein the ML Model is updated in real-time without requiring a re-boot of the computer.

22. The method of claim 21, further comprising:
intermediating, with a kernel module implemented with the CPU, a predetermined selection of second tier calls between the Kernel/Operating System and the applications, and storing identifying information pertaining to the intermediated second tier calls (second tier call IDs) in the data store;
aggregating and mapping, with the Analytic Engine, the stored first tier call IDs and second tier call IDs to the ML Model, to generate said threat analysis, the ML Model including patterns of first tier call IDs and second tier call IDs associated with identifiable security threats;
selectively enlarging or contracting, with the Analytic Engine, the predetermined selection of second tier calls to respectively increase or decrease specificity of said threat analysis; and
communicably coupling the Management Module to the Kernel Module, wherein the user interfaces enable a user to configure the Kernel module.

23. The method of claim 22, wherein said implementing (e) further comprises implementing one or more of a plurality of responsive actions including process termination, thread termination, event and alert notification and logging, user disablement, network disconnection, and process fingerprinting.

24. The method of claim 22, further comprising:
collecting, with a user space module implemented with a processor, a predetermined selection of user space data associated with the applications, and storing identifying information pertaining to the collected user space data (user space IDs) in the data store;
said aggregating and mapping (b) further comprises aggregating and mapping the stored first tier call IDs, second tier call IDs, and the user space IDs to the rulebase, to generate a threat analysis, the rulebase including patterns of first tier call IDs, second tier call IDs and user space IDs associated with identifiable security threats; and
said selectively enlarging or contracting (c) further comprising selectively enlarging or contracting the predetermined selection of first tier calls, the predetermined selection of second tier calls, and/or the predetermined selection of user space data to respectively increase or decrease the specificity of said threat analysis.

25. The method of claim 24, wherein said selectively enlarging or contracting (c) further comprises automatically enlarging the predetermined selection of first tier calls, the predetermined selection of second tier calls, and/or the predetermined selection of user space data to increase the specificity of said threat analysis from a base level to one or more escalated levels when the threat analysis identifies a potential security threat.

26. The method of claim 25, wherein said selectively enlarging or contracting (c) further comprises automatically contracting the predetermined selection of first tier calls, the predetermined selection of second tier calls, and/or the predetermined selection of user space data to decrease the specificity of said threat analysis from the one or more escalated levels towards the base level once one or more of the plurality of responsive actions has been implemented.

27. The method of claim 24, wherein said collecting further comprises collecting a predetermined selection of user space data including one or more of (i) Application Mouse Activity, (ii) Application Keyboard Activity, (iii) System Logfile Activity, and (iv) System Registry Fields.

28. The method of claim 19, further comprising creating, deploying, and updating the ML Model by:
(f) generating a base model using known malware and known goodware;
(g) generating the ML Model for a particular customer using the known malware, the known goodware, and customer specific goodware for the particular customer;
(h) determining ML Model accuracy and comparing the ML Model accuracy to a predetermined accuracy threshold;
(i) if the ML Model accuracy is greater than or equal to the accuracy threshold, then comparing the ML Model accuracy to current accuracy of a model deployed at the particular customer;
(j) if the ML Model accuracy is greater than the current accuracy, then replacing the model deployed at the particular customer with the ML Model; and
(k) repeating said (f)-(j) periodically as additional known malware, known goodware, and/or customer specific goodware become available.

29. The method of claim 28, being performed for a plurality of particular customers.

30. The method of claim 29, wherein:
(l) if the ML Model accuracy is less than the predetermined accuracy threshold, then comparing base model accuracy to said current accuracy;
(m) if the base model accuracy is greater than said current accuracy, then replacing the model deployed at the particular customer with the base model; and
(n) repeating said (l)-(m) periodically.

* * * * *